(12) United States Patent
Kamon et al.

(10) Patent No.: US 6,424,422 B1
(45) Date of Patent: Jul. 23, 2002

(54) THREE-DIMENSIONAL INPUT DEVICE

(75) Inventors: Koichi Kamon, Takatsuki; Hideki Tanabe; Makoto Miyazaki, both of Ibaraki; Toshio Norita, Osaka, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/334,918

(22) Filed: Jun. 17, 1999

(30) Foreign Application Priority Data

Jun. 18, 1998 (JP) .......................... 10-171206
Jul. 7, 1998 (JP) .......................... 10-191278

(51) Int. Cl.⁷ .............................. G01B 11/24
(52) U.S. Cl. .................. 356/623; 356/3.09; 250/559.23
(58) Field of Search ................. 356/376, 375, 356/372, 606, 623, 3.09, 3.1, 4.07, 613, 602, 5.1, 3.01; 250/559.22, 559.23, 559.31, 559.29; 382/165, 209, 224, 154

(56) References Cited

U.S. PATENT DOCUMENTS

| | | | | |
|---|---|---|---|---|
| 4,939,379 A | * | 7/1990 | Horn | 356/376 |
| 5,024,529 A | * | 6/1991 | Svetkoff et al. | 356/376 |
| 5,102,223 A | * | 4/1992 | Uesugi et al. | 356/376 |
| 5,668,631 A | | 9/1997 | Norita et al. | |
| 6,094,270 A | * | 7/2000 | Uomori et al. | 356/376 |
| 6,141,105 A | * | 10/2000 | Yahashi et al. | 356/376 |
| 6,252,659 B1 | * | 6/2001 | Norita et al. | 356/376 |
| 6,268,918 B1 | * | 7/2001 | Tanabe et al. | 356/376 |

* cited by examiner

Primary Examiner—Hoa Q. Pham
(74) Attorney, Agent, or Firm—McDermott, Will & Emery

(57) ABSTRACT

A three-dimensional input device including a light projecting device for projecting detection light, and an image sensing device for receiving the detection light reflected by an object and converting the received light to electrical signals. The detection light is controlled so as to scan the object periodically while changing the projection direction of the detection light, and to consecutively perform a plurality of scans at mutually different detection light projection angles in accordance with the predefined specifications at the start of operation.

30 Claims, 28 Drawing Sheets

$a + [(np/2) + 16]pv$

| Conditions for Selecting Data | Data for Used in Center Calculation |
|---|---|
| Xmax2 ≤ XLb | Xi2 |
| XLb<Xmax2<XHb | Xi1 |
| XHb ≤ Xmax2 | Xi3 |

THREE-DIMENSIONAL INPUT DEVICE

BACKGROUND OF THE INVENTION

1. Field of the Invention

The present invention relates to a three-dimensional input device for scanning an object by projecting a detection light on the object and outputting data specifying the object shape.

2. Description of the Related Art

Three-dimensional input devices of the non-contact type known as rangefinders are used for data input to computer graphics systems and computer-aided design systems, physical measurement, and visual recognition for robots and the like, due to their high speed measurement capability compared to contact type devices.

The slit projection method (also referred to as light-section method) is known as a suitable measurement method for rangefinders. This method produces a distance image (three-dimensional image) by optically scanning an object, and is one type of active measurement method which senses an object by illuminating the object with a specific detection light. A distance image is a collection of pixels expressing the three-dimensional position at a plurality of parts on an object. In the slit projection method, the slit light used as the detection light is a projection beam having a linear band-like cross section. A part of an object is illuminated at a specific moment during the scan, and the position of this illuminated part can be calculated by the trigonometric survey method from the light projection direction and the high luminance position on the photoreceptive surface (i.e., photoreception direction). Accordingly, a group of data specifying the object shape can be obtained by sampling the luminance of each pixel of the photoreceptive surface.

In rangefinders the distance to an object is measured and the detection light projection angle range is adjusted. In other words, an operation control is executed to set the projection light start and end angle position so that the entirety of an object reflected on the photoreceptive surface becomes the scanning range in accordance with the image sensing magnification and the object distance. In sampling the luminance of the photoreceptive surface, methods are known which limit the object of a single sampling not to the entire photoreceptive surface but to a part of the area where detection light is expected to enter, and shifts this area for each sampling. Such methods are capable of scanning at high speed by reducing the time required per sample, and further reduce the load on the signal processing system by decreasing the amount of data.

However, in conventional rangefinders, when a measurement object extends beyond a measurable range in the depth direction, an operator must change the field angle by adjusting the focus or zooming, then re-measuring. As the field angle broadens, the measurable range in the depth direction also broadens, but resolution declines. When part of the photoreceptive surface is the target of a single sampling, the measurable range broadens if this target area broadens. As a result, scanning speed is reduced and the data processing load increases.

Accordingly, a first objective of the present invention is to allow three-dimensional data input for an entire object with the same resolution as when the depth dimension is small even when the depth dimension of the object is large.

In addition to the foregoing, in rangefinders the detection light projection intensity is adjusted for the main measurement by performing a preliminary measurement. In other words, an operation setting is executed wherein the detection light is projected to a part of the image sensing range and the projection intensity is optimized in accordance with the amount of the detection light entering the photoreceptive surface.

In conventional devices, however, when an object used as a measurement object has non-uniform reflectivity, i.e., when there is a large divergence between the high and low reflectivity levels of the object, the detection light reception information corresponding to that part of the object attains saturation or attains a solid level (non-responsive), such that the shape of that area cannot be measured. In this instance, measurement must be performed began to obtain the shape data of the entire object.

Accordingly, a second objective of the present invention is to provide a three-dimensional input device capable of obtaining three-dimensional data with a precision identical to that of an object with uniform reflectivity without receiving operation specifications a plurality of times even when there are marked differences in reflectivity depending on the part of the object.

SUMMARY OF THE PRESENT INVENTION

In accordance with the first objective noted above, in one exemplary embodiment of the present invention, the detection light projection angle range is automatically changed, and a plurality of scans are performed. As a result, suitable photoreception information can be obtained by other scans even at the parts of the object from which effective photoreception information cannot be obtained by a particular scan. In other words, the number of scans is theoretically expanded many fold by combining the measurable photoreception range in the depth direction with the measurable photoreception range in each scan.

In accordance with the foregoing embodiment of the present invention, a three-dimensional input device comprises a light projecting means for projecting detection light, and an image sensing means for receiving the detection light reflected by an object and converting said received light to electrical signals, which scans an object periodically while changing the projection direction of the detection light, and consecutively performs a plurality of scans at mutually different detection light projection angle ranges in accordance with the specifications at the start of operation. The specifications at the start of the operation are set by control signals produced by operating a switch or button, or received from an external device.

In accordance with the second objective noted above, in a second exemplary embodiment of the present invention, the projection intensity is automatically changed, and a plurality of scans are performed. As a result, suitable photoreception information can be obtained at other projection intensities even for an area on an object for which suitable photoreception information cannot be obtained at a particular projection intensity. In other words, the amount of entrance light dependent on the reflectivity of a target area can be made to conform to the dynamic range of image sensing and signal processing in at least a single scan. As such, it is possible to measure the shape of the entire area of the measurement range of an object by selecting suitable photoreception data for each part of an object from among photoreception information of a plurality of scans. The objects of the present invention are attained at the moment photoreception information is obtained for a plurality of scans, and the selection of suitable photoreception information can be accomplished within the three-dimensional input device, or by an external device.

Moreover, in the second exemplary embodiment of the present invention, the photo electric conversion signals obtained by a first scan are amplified by different amplification factors. As a result, photoreception information is obtained which is equivalent to the information obtained by a plurality of scans at different projection intensities, and allows the selection of suitable photoreception information for each part of an object.

In accordance with the second exemplary embodiment of the present invention, a three-dimensional input device comprises a light projecting means for projecting detection light, and an image sensing means for receiving the detection light reflected by an object and converting the received light to electrical signals, which scans an object periodically while changing the projection direction of the detection light, and consecutively projects the projection light at different intensities for each of a plurality of scans in accordance with specifications at the start of operation. The specifications at the start of the operation are set by control signals produced by operating a switch or button, or received from an external device.

Additional objects and advantages and novel features of the present invention will be set forth in part in the description which follows, and in part will become apparent to those skilled in the art upon examination of the following.

The invention itself, together with further objects and advantages, can be better understood by reference to the following detailed description and the accompanying drawings.

BRIEF DESCRIPTION OF THE DRAWINGS

The accompanying drawings, which are incorporated in and form a part of the specification, illustrate the embodiments of the present invention and, together with the description, serve to explain the principles of the invention.

DESCRIPTION OF THE PREFERRED EMBODIMENTS

In the following description, numerous specific details are set forth in order to provide a thorough and detailed understanding of the system of the present invention. It will be obvious, however, to one skilled in the art that these specific details need not be employed exactly as set forth herein to practice the present invention.

Figure 1:
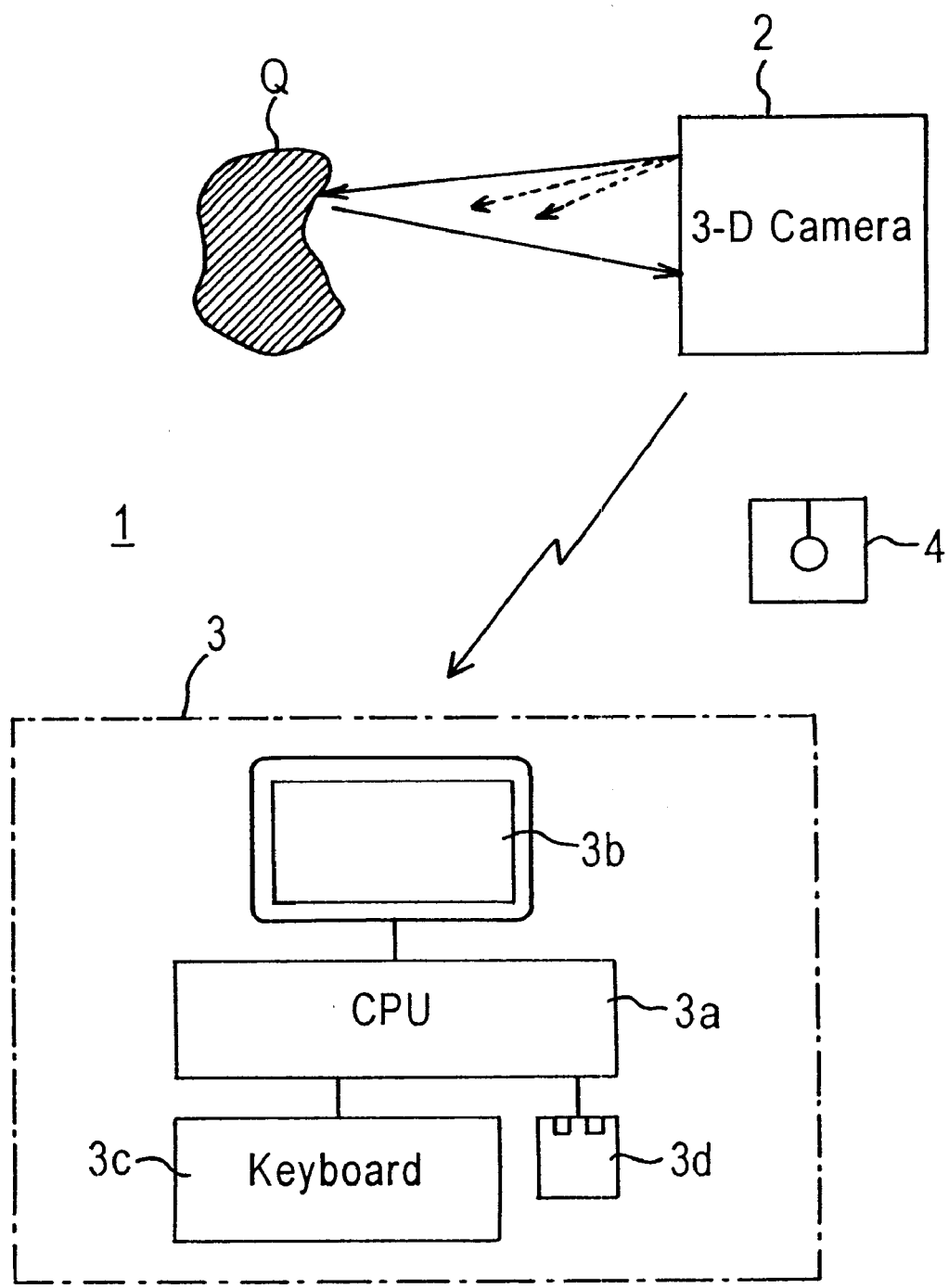
FIG. 1 illustrates an exemplary block diagram of the measuring system of the present invention.

FIG. 1 shows the construction of a measuring system 1 of the present invention. The measuring system 1 comprises a three-dimensional camera (rangefinder) 2 for performing stereoscopic measurement using the slit projection method, and a host computer 3 for processing the data output from the three-dimensional camera 2.

The three-dimensional camera 2 outputs measurement data specifying the three-dimensional positions of a plurality of sampling points on an object Q, and outputs data necessary for calibration and a two-dimensional image expressing the color information of the object Q. The host computer 3 manages the calculation process for determining the coordinates of the sampling points using the trigonometric survey method.

The host computer 3 comprises a central processing unit (CPU) 3a, a display 3b, a keyboard 3c, and a mouse 3d.

Software for measurement data processing is included in the CPU 3a. Data can be transferred between the host computer 3 and the three-dimensional camera 2 either online or offline using a portable recording medium 4. A magneto-optic disk (MO), minidisk (MD), memory card and the like maybe used as the recording medium 4.

Figure 2A:
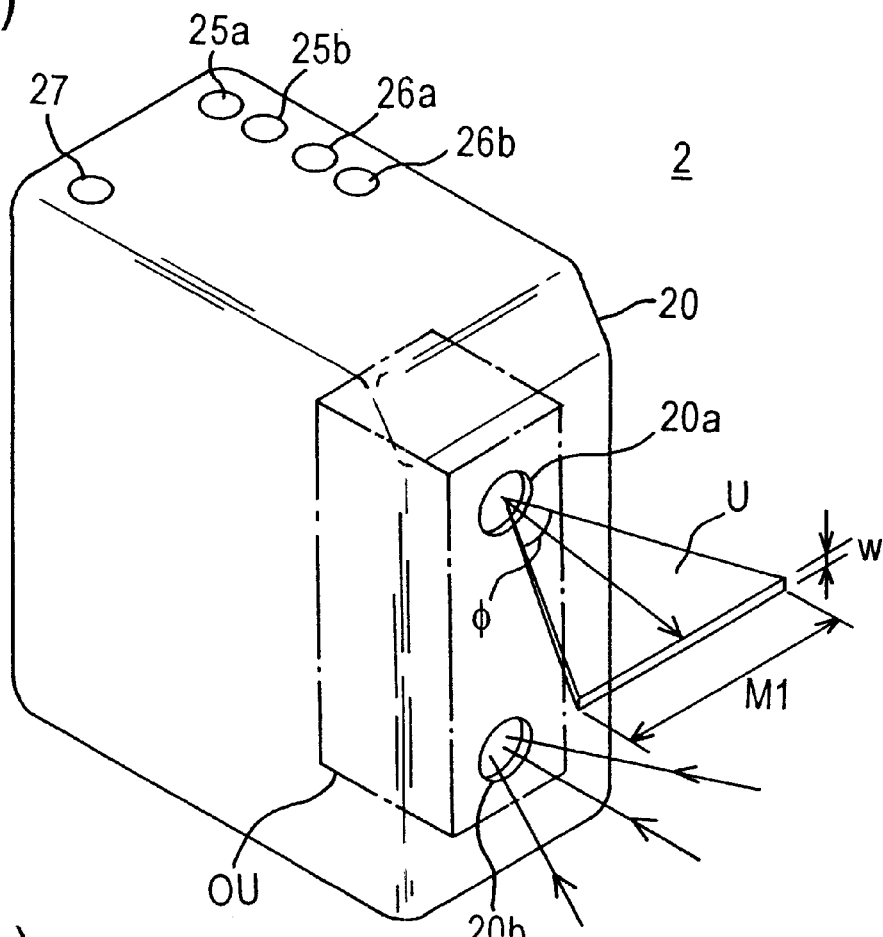
FIG. 2 illustrates an exemplary external view of a three-dimensional camera of the present invention.

FIG. 2 illustrates an exemplary external view of a three-dimensional camera of the present invention. A projection window 20a and a reception window 20b are provided on the front surface of a housing 20. The projection window 20a is positioned on the top side relative to the reception window 20b. The slit light (a band-like laser beam of predetermined width w) U emitted from an internal optical unit OU is directed toward the object being measured (photographic object) through the projection window 20a. The radiation angle φ in the lengthwise direction M1 of the slit light U is fixed. The optical unit OU is provided with a two-axis adjustment mechanism for optimizing the relative relationship between the projection light axis and the reception light axis.

Figure 2B:
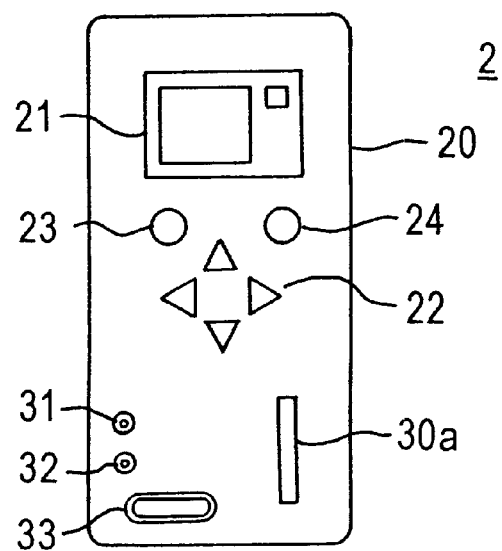

The top surface of the housing 20 is provided with zoom buttons 25a and 25b, manual focusing buttons 26a and 26b, and a shutter button 27. As shown in FIG. 2b, the back surface of the housing 20 is provided with a liquid crystal display 21, a cursor button 22, a selector button 23, a cancel button 24, an analog output pin 32, a digital output pin 33, and an installation aperture 30a for the recording medium 4.

The liquid crystal display (LCD) 21 is used as a display for the operation screens, and as an electronic viewfinder. A photographer sets the photographic mode by means of the various buttons 22 through 24 on the back surface. Two-dimensional image signals are output in NTSC form at from the analog output pin 32. The digital output pin 33 is, for example, a SCSI pin.

Figure 3:
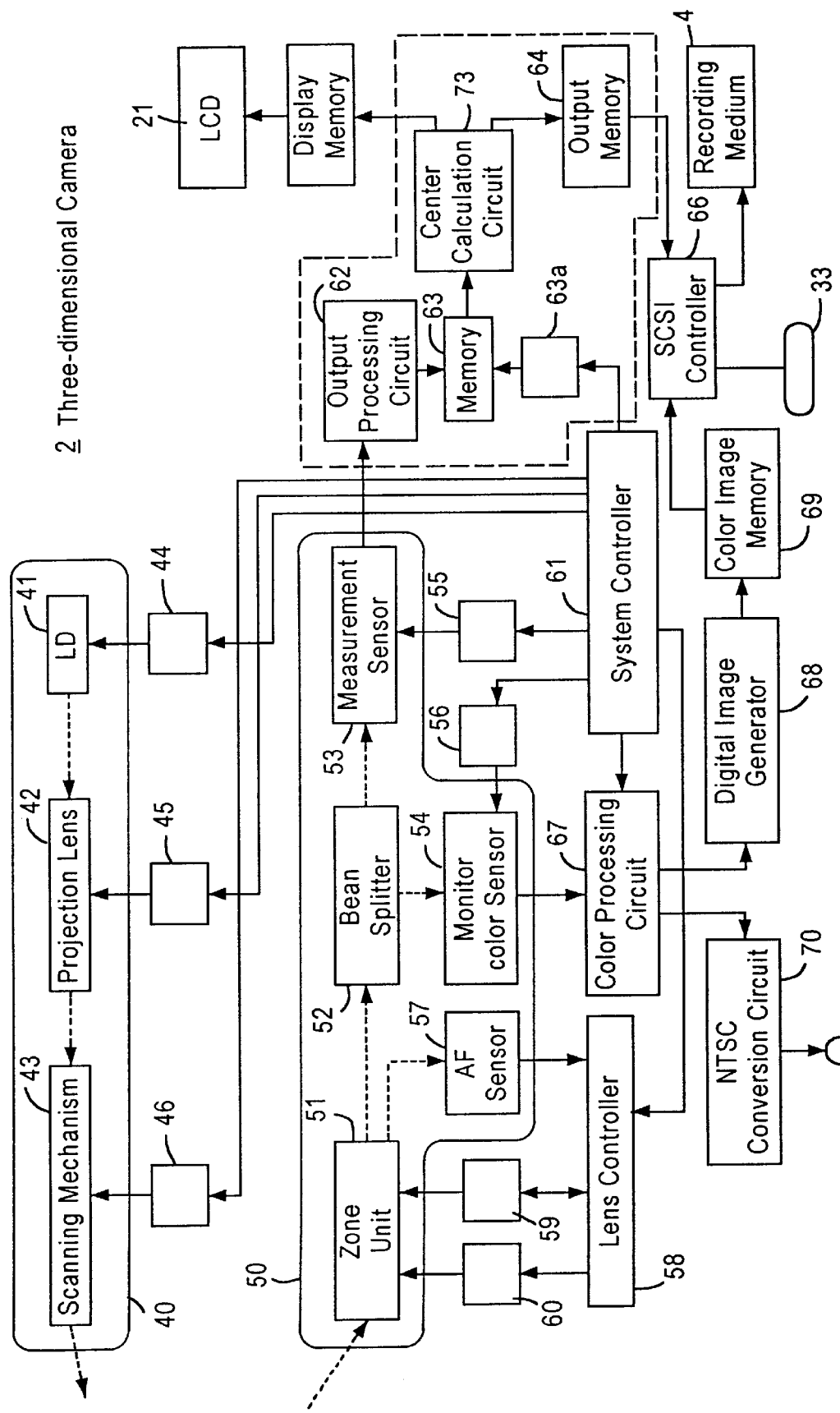
FIG. 3 is a block diagram illustrating the functional operation of the three-dimensional camera 2.

FIG. 3 is a block diagram illustrating the functional operation of the three-dimensional camera 2. The solid arrow in the drawing indicates the flow of the electrical signals, and the broken arrow indicates the flow of light.

The three-dimensional camera 2 is provided with two optical units 40 and 50 on the light projection side and the light reception side, which comprise the previously mentioned optical unit OU. In the optical unit 40, a laser beam having a wavelength of 670 nm emitted from a semiconductor laser (LD) 41 passes through a projection lens 42 to form the slit light, which is deflected by a galvano mirror (scanning mechanism) 43. A system controller 61 controls the driver 44 of the semiconductor laser 41, the drive system 45 of the projection lens system 42, and the drive system 46 of the galvano mirror 43.

In the optical unit 50, light focused by the zoom unit 51 is split by the beam splitter 52. The light in the oscillation wavelength range of the semiconductor laser 41 enters a measurement sensor 53. The light in the visible range enters the monitor color sensor 54. The sensor 53 and the color sensor 54 are both charge-coupled device (CCD) area sensors. The zoom unit 51 is an internal focus type, which uses part of the entering light for autofocusing (AF). The autofocus function is realized by an autofocus (AF) sensor 57, a lens controller 58, and a focusing drive system 59. The zooming drive system 60 is provided for non-manual zooming.

Image sensing information obtained by the sensor 53 is transmitted to the output processing circuit 62 synchronously with a clock signal from the drive 55. In accordance with a first embodiment of the present invention, the image sensing information is temporarily stored in the memory 63 as 8-bit photoreception data. The address specification in the memory 63 is performed by the memory controller 63 A. The photoreception data are transmitted from the memory 63 to the center calculation circuit 73 with a predetermined timing, and the center calculation circuit 73 generates data (hereinafter referred to as "center ip") used as a basis for the calculation of the three-dimensional position of a target object. The center ip data are transmitted as a calculation result through the output memory 64 to the SCSI controller 66. The center ip data are output as monitor information from the center calculation circuit 73 to the display memory 74, and used to display a distance image on the liquid crystal display (LCD) 21.

In accordance with a second embodiment of the present invention, the output processing circuit 62 generates data the "center ip" used as a basis for the calculation of the three-dimensional position of a target object based on the input image sensing information, and outputs the center ip as a measurement result to the SCSI controller 66. The data generated by the output processing circuit 62are output as monitor information to the display memory 74, and used to display a distance image on the liquid crystal display 21. The output processing circuit 62 is described in detail later.

The image sensing information obtained by the color sensor 54 is transmitted to the color processing circuit 67 synchronously with clock signals from the driver 56. The image sensing information obtained by the color processing is output online through the NTSC conversion circuit 70 and the analog output pin 32, or is binarized by the digital image generator 68 and stored in the color image memory 69. Thereafter, the color image data are transmitted from the color image memory 69 to the SCSI controller 66.

The SCSI controller 66 outputs the data from the output memory 64 (first embodiment) or the output processing circuit 62 (second embodiment) and the color image from the digital output pin 33, or stores the data on the recording medium 4. The color image is an image having the same field angle as the distance image based on the output of the sensor 53, and is used as reference information by application processing on the host computer 3 side. The processes using color information include, for example, processes for generating a three-dimensional model by combining the measurement data of a plurality of groups having different camera perspectives, and processes for culling unnecessary peaks from a three-dimensional model. The system controller 61 provides specifications for displaying suitable text and symbols on the screen of the liquid crystal display 21 relative to a character generator not shown in the drawings.

First Embodiment

Figure 4:
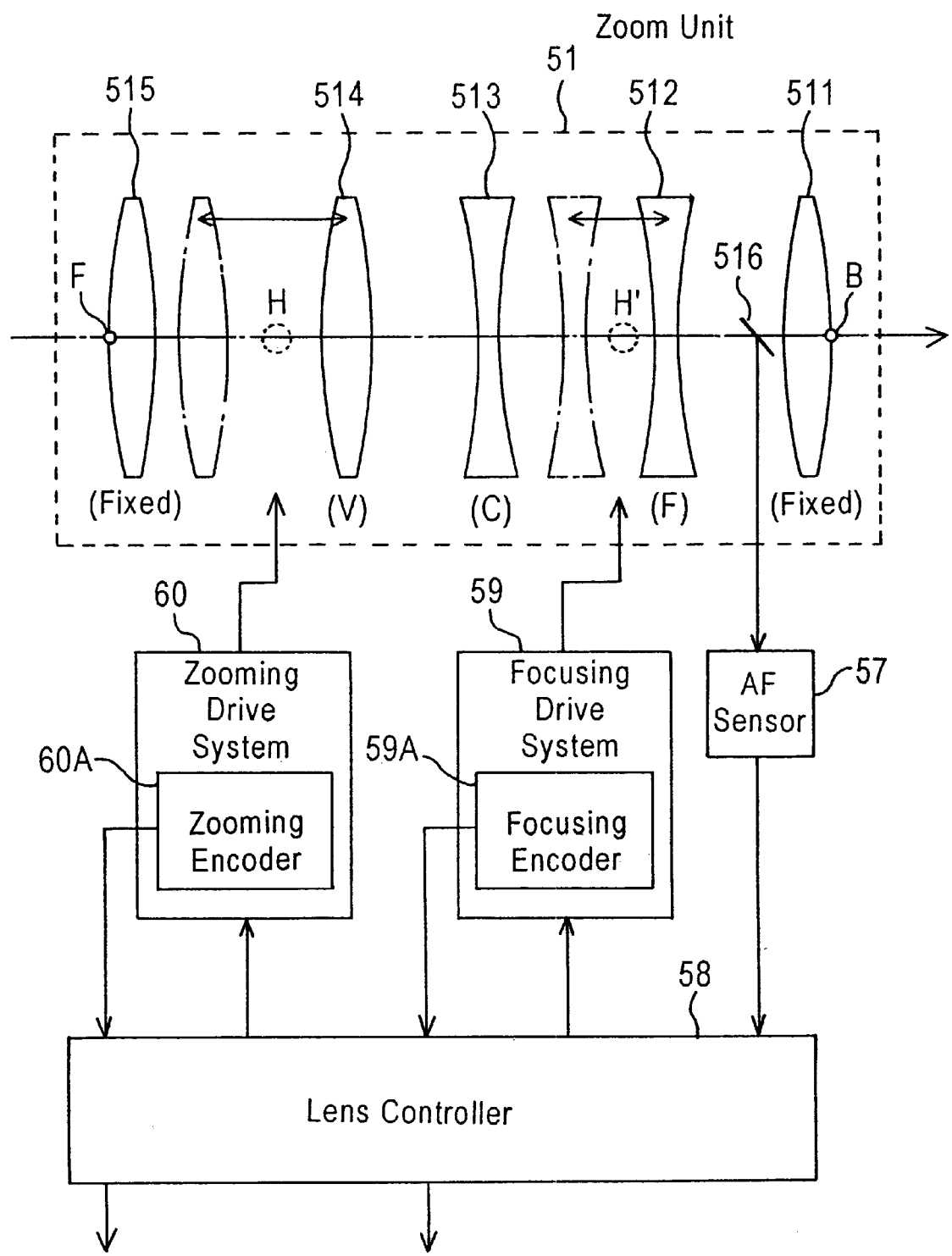
FIG. 4 is a schematic diagram of the zoom unit 51 for photoreception in accordance with the first embodiment of the present invention.

In accordance with the first embodiment of the present invention, FIG. 4 is a schematic diagram of the zoom unit 51 for photoreception.

The zoom unit 51 comprises a front image forming unit 515, a variator 514, a compensator 513, a focusing unit 512, a back image forming unit 511, and a beam splitter 516 for guiding part of the incidence light to the AF sensor 57. The front image forming unit 515 and the back image forming unit 511 are fixed relative to the optical path.

The movement of the focusing unit 512 is managed by the focus drive system 59, and the movement of the variator 514 is managed by the zoom drive system 60. The focus drive system 59 is provided with a focusing encoder 59 A for specifying the moving distance (lens feedout amount Ed) of the focusing unit 512. The zoom drive system 60 is provided with a zooming encoder 60 A for specifying the moving distance (lens notch value fp) of the variator 514.

Figure 5A:
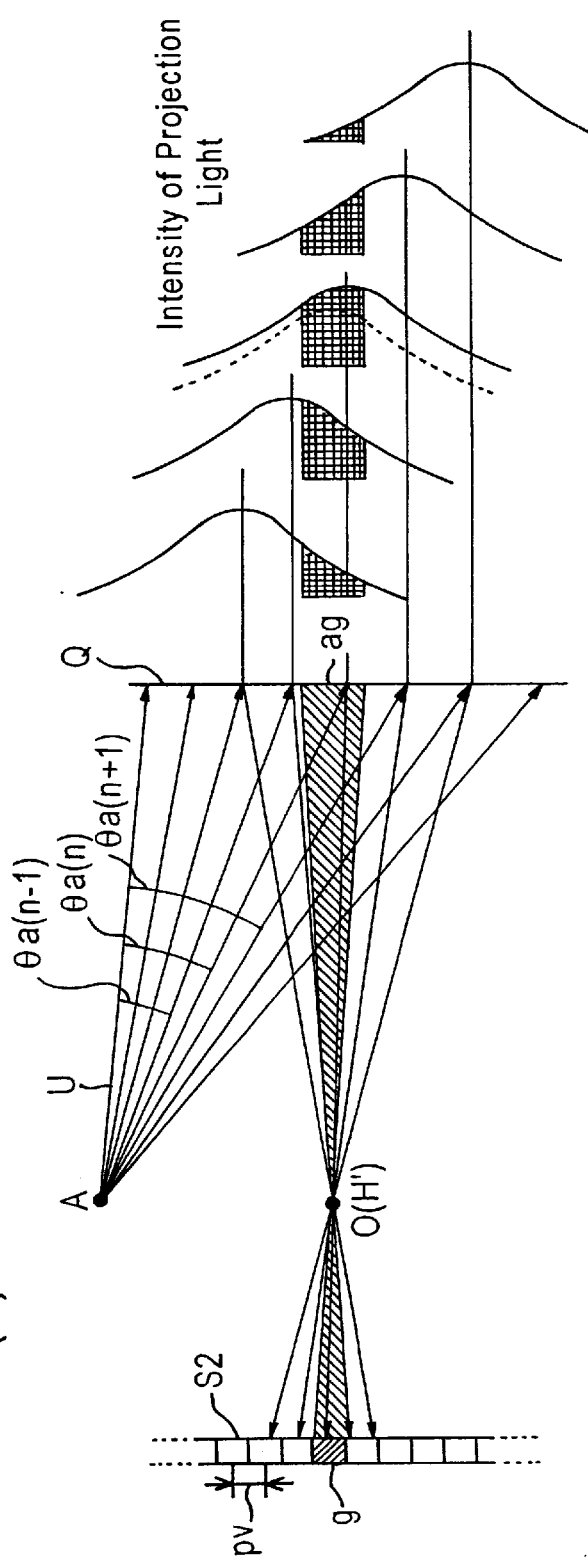
FIG. 5 illustrates the principle of the three-dimensional position calculation by the measuring system 1.
Figure 5B:
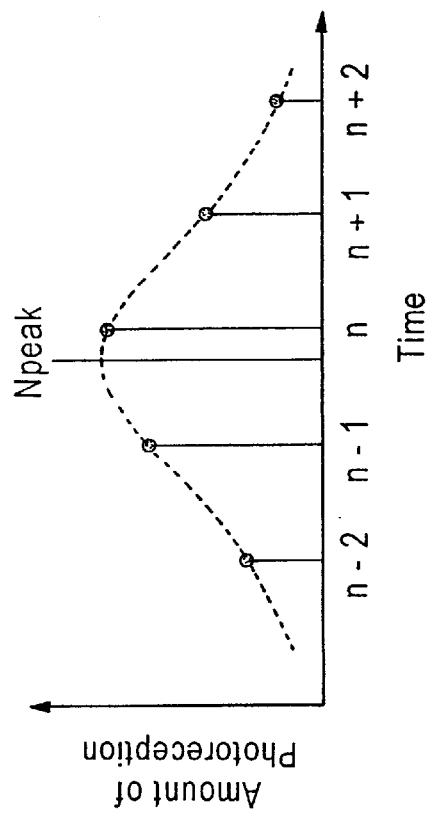
Figure 6:
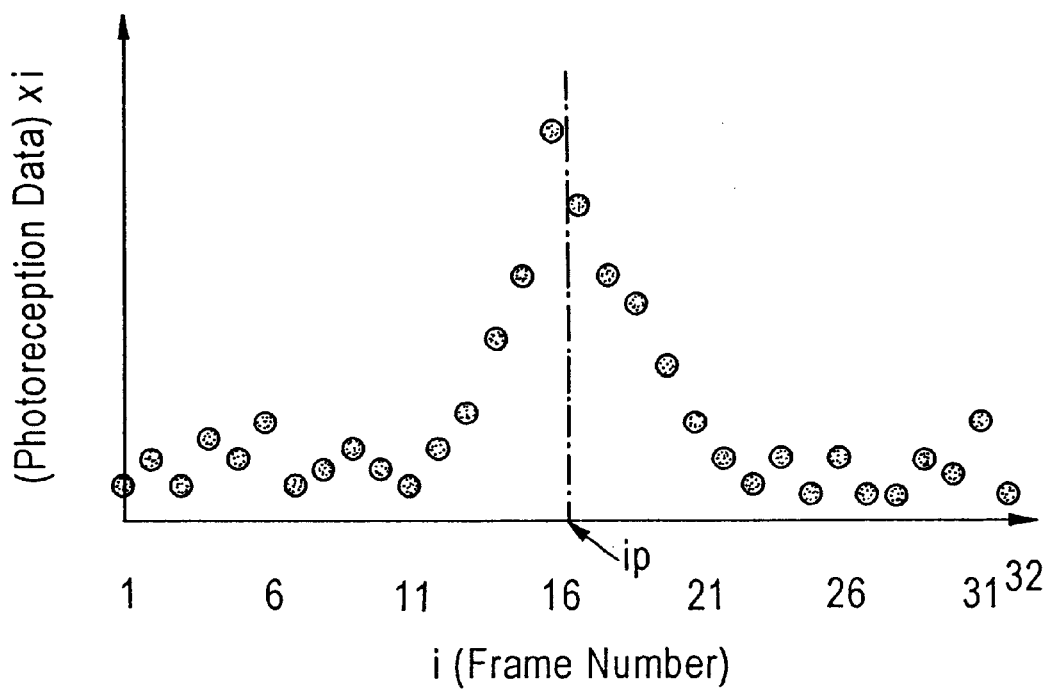
FIG. 6 illustrates the concept of the center ip.

FIG. 5 illustrates the principle of the three-dimensional position calculation in measuring system 1, and FIG. 6 illustrates the concept of the center ip. In is noted that although only five photoreception samplings are shown in FIG. 5 to simplify the discussion, the three-dimensional camera 2 conducts 32 samplings per pixel.

As shown in FIG. 5, the slit light U projected on the object Q has a relatively wide width of several pixels g extending at pitch pv of the slit width on the image sensing surface 2 of the sensor 53. Specifically, the width of the slit light U is approximately 5 pixels. The slit light U is deflected at equal angular speed about origin point A in vertical directions. The slit light U reflected by the object Q passes through the principal point 0 (principal point H' on the back side of zoom) of image formation, and enters the image sensing surface S2. The object Q (specifically, the object image) is scanned by periodic sampling of the amount of light received by the sensor 53 in the projection of the slit light U. Photoelectric conversion signals are output for each frame from sensor 53 in each sampling period (sensor actuation period).

When the surface of the object Q is flat and there is no noise in the characteristics of the optical system, the amount of received light by each pixel g of the image sensing surface S2 of the sensor 53 reaches a maximum at the time Npeak at which the optical axis of the slit light U passes through the object surface ag is in the estimated range of pixel g, and the temporal distribution approaches a normal distribution. In the examples shown in FIG. 5b, the time Npeak occurs between the No. n sample and the previous (n−1) sample.

In the present embodiment, one frame is designated as 32 lines corresponding to part of the image sensing surface S2 of the sensor 53. Accordingly, when one pixel g is targeted on the image sensing surface S2, 32 samplings are executed during the scan, and 32 individual photoreception data are obtained. The center ip (time center) corresponding to the time Npeak is calculated by a center calculation using the photoreception data of the aforesaid 32 frames.

The center ip is the center on the time axis of the distribution of the 32 photoreception data obtained by the 32 samplings as shown in FIG. 6. The 32 photoreception data of each pixel are provided a sampling number of 1 through 32. The No. i photoreception data are expressed as xi, where i is an integer of 1 to 32. At this time, i represents the frame number aftre the target pixel is entered from the effective photoreception range comprising 32 lines.

The center ip of the 1 through 32 photoreception data x1 through x32 is determined by dividing the total sum $\Sigma \cdot x1$ of the data i·xi by the total sum $\Sigma xi$ of data xi.

$$ip = \frac{\sum_{i=1}^{32} i \cdot xi}{\sum_{i=1}^{32} xi} \tag{1}$$

The center calculation circuit 73 calculates the center ip (i.e., the time center Npeak) using equation 1.

The host 3 calculates the position (coordinates) of the object Q using trigonometric survey method based on the relationship between the projection direction of the slit light U at the determined center ip and the entrance direction of the slit light U on the target pixel g. As such, it is possible to measure with higher resolution than the resolution stipulated by the pitch pv of the pixel array of the image sensing surface S2.

The measurement sequence and combination of the operation of the host 3 and the operation of the three-dimensional camera 2 of the first embodiment of the present invention are described below.

A user (photographer) determines the camera position and direction and sets the field angle while viewing a color monitor image displayed on the LCD 21. Either a zooming operation or focusing operation or both are performed as necessary at this time. In response to the operation, the variator 514 and the focusing unit 512 in the zoom unit 51 are moved, and the lens notch value fp and the lens feedout amount Ed at this time are successively transmitted to the system controller 61 through the lens controller 58. The system controller 61 calculates the object interval distance D using a conversion table generated beforehand based on equation 2:

$$D = G(fp, Ed) \tag{2}$$

Where G represents a function.

When a user turns ON the shutter button 27, the field angle is set. When this setting is received by the system controller 61, the slit light U deflection parameters (scan start angle, scan end angle, deflection angular speed) are set based on the determined object interval distance D.

Figure 7:
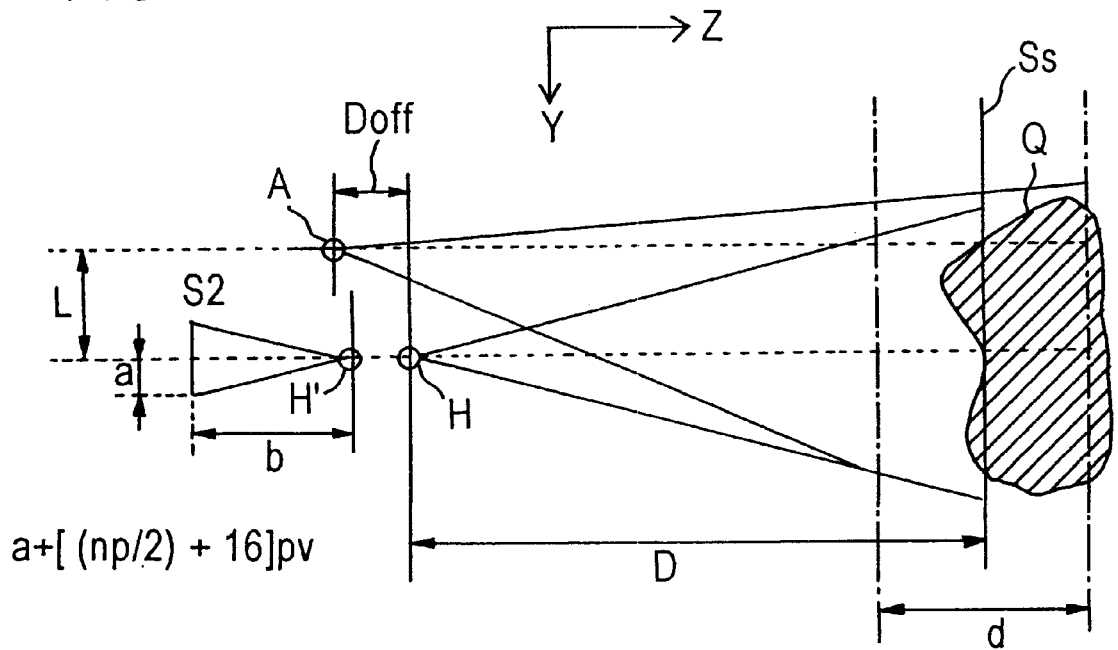
FIG. 7 is an exemplary schematic diagram illustrating the positional relationship between the object and the principal point of the optical system.

FIG. 7 is a schematic diagram of the positional relationship between the object and the principal point of the optical system.

The basic content of setting the deflection parameters are described below. Assume the presence of a reference plane Ss at the position of the object interval distance D, and infer a region reflected (projected) on the image sensing surface S2 in the reference plane Ss from the image sensing magnification. The scan start angle and the scan end angle are determined so that the slit light U is projected from the bottom edge of the whole region, and the deflection angular speed is determined so that the required time of the scan is a constant value.

In actual settings, the offset Doff between the origin A and the anterior principal point H of the optical system, which is the measurement reference point of the object interval distance D, in the Z direction, is considered. In order to assure a measurable distance range d similar to the center area even at the edges of the scan, a predetermined amount of over scan (e.g., 16 pixels) is used. The scan start angle th1, the scan end angle th2, and the deflection angular speed ω are expressed in the following equations:

$$th1 = \tan^{-1}[\beta \times pv(np/2+16)+L)/(D+Doff)] \times 180/\pi \tag{3}$$

$$th2 = \tan^{-1}[\beta \times pv(np/2+16)+L)/(D+Doff)] \times 180/\pi \tag{4}$$

$$\omega = (th1 - th2)/np \tag{5}$$

Where β represents the image sensing magnification (=D/real focal length freal), pv represents the pixel pitch, np represents the effective pixel number in the Y direction of the image sensing surface S2, and L represents the base line length.

The measurable distance range d is dependent on the number of lines of one frame in the readout operation by the sensor 53. The greater the number of lines, the broader the measurable distance range becomes, and the readout time lengthens, data quantity increases and the processing load increases. The present embodiments are based on this principle and use 32 lines per frame as stated above.

If the object Q fits within the measurable distance range d, the object Q can be measured in a single scan. However, when the object Q has a large dimension in the depth direction (Z direction), such that part of the object Q extends beyond the measurable distance range, the shape data of that part cannot be obtained.

The three-dimensional camera 2 consecutively performs a plurality of scans (specifically, 3), while automatically changing the reference plane Ss. In this way shape data are obtained in a broader range than the measurable distance range d without reduction of resolution.

Figure 8:
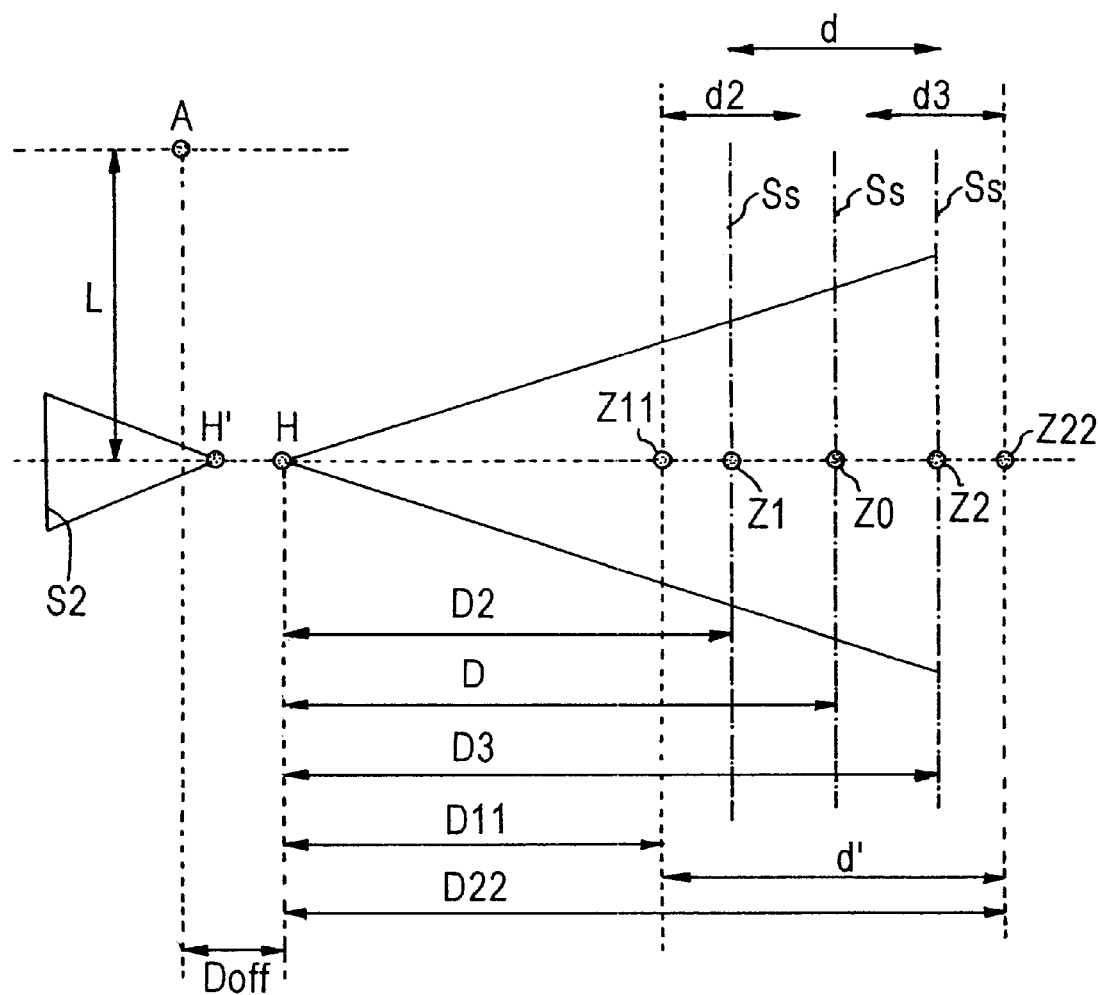
FIG. 8 shows an example of the positional change of the reference plane Ss.

FIG. 8 shows an example of the positional change of the reference plane Ss.

In the first scan the reference plane Ss is set at position Z0 of the object interval distance D, in the second scan the reference plane Ss is set at position Z1 of the object interval distance D1 (D1<D), and in the third scan the reference plane Ss is set at the position Z2 of the object interval distance D2 (D2>D). That is, in the second scan the reference plane Ss is moved to the front side, and in the third scan the reference plane Ss is moved to the back side. The sequence of the scan and the reference plane Ss position are optional, and the back side scan maybe performed before the front side scan without problem. The object interval distances D1 and D2 are set such that the measurable distance ranges d2 and d3 of the second and third scans partially overlap the measurable distance range d of the first scan. Overlapping the measurable distance ranges d, d2, d3 allows the shape data obtained in each scan to be easily combined. Since the image sensing ratio is fixed in all three scans, the angle range for projecting the slit light U changes if the reference plane Ss position changes. Accordingly, the deflection parameters are calculated for each scan.

Figure 9:
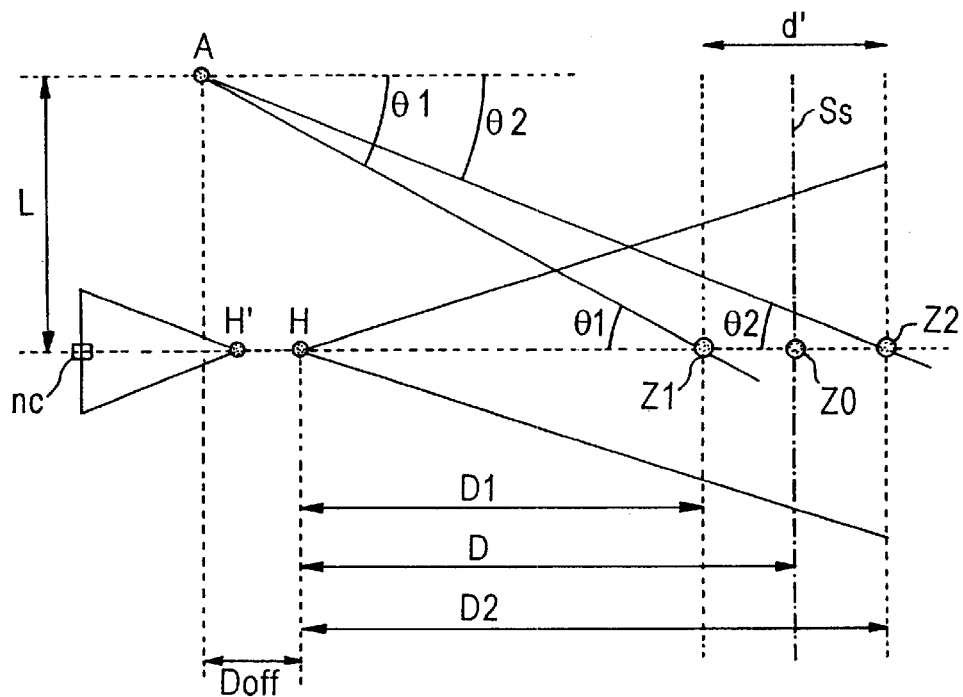
FIG. 9 illustrates an example of the measurable distance range.
Figure 10:
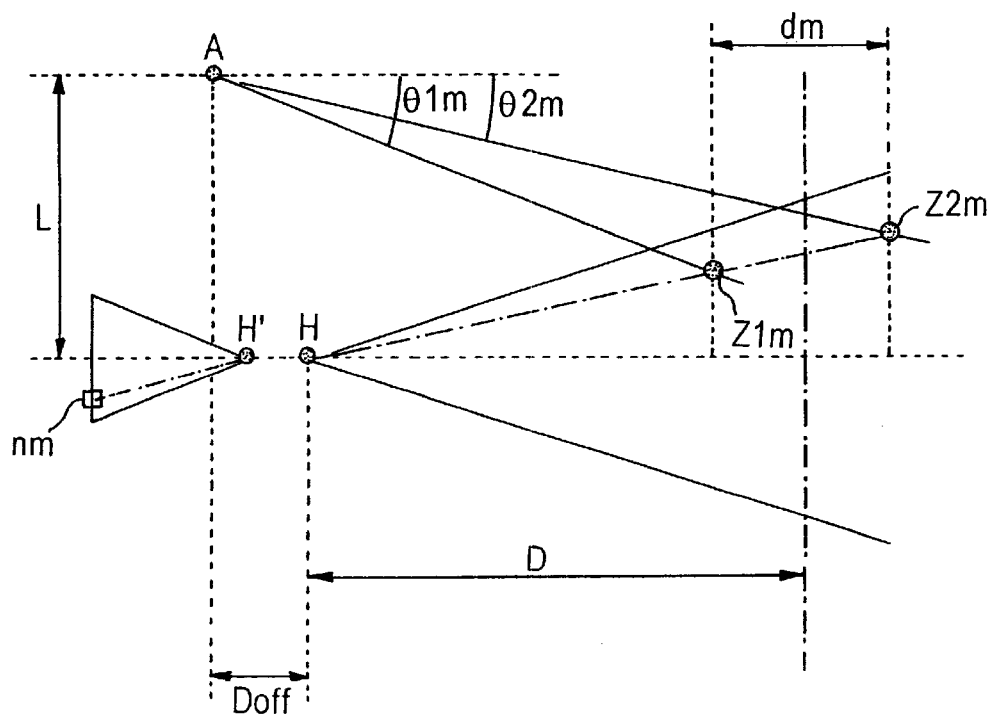
FIG. 10 illustrates an example of the measurable distance range.

FIGS. 9 and 10 illustrate the measurable distance range.

When the reference plane Ss is set at position Z0 as in FIG. 9, and the address in the Y direction of the pixel through which pass the photoreception axis in the image sensing surface S2 is designated nc, the scan angle θ1 at the start of sampling of the pixel at address nc can be expressed as shown below:

$$\theta 1 = th1 - \omega \quad (6)$$

The addresses in the Y direction are incremented 1, 2, 3. . . , with the top address (scan start address) designated 1.

The scan angle θ2 at the end of the sampling of the pixel at address nc is determined by the following equation when the number of samples per pixel is designated j (i.e., 32 in the present example).

$$\theta 2 = \theta 1 \omega x (j-1) \quad (7)$$

The measurable distance range d' of the pixel at address nc is the depth range from the intersection point Z1 of the projection axis of the scan angle θ1 and the line of sight of the pixel at address nc to the intersection point Z2 of the projection axis of the scan angle θ2 and the line of sight of the pixel at address nc.

Similarly, other than the address nc, the scan angles θ1$m$ and θ2$m$ of the sampling start and end of address nm can be determined. The measurable distance range dm of the pixel at address nm is the depth range from the intersection point Z1 of the projection axis of the scan angle θ1$m$ the line of sight of the pixel at address nm to the intersection point Z2 of the projection axis of the scan angle θ2$m$ and the line of sight of the pixel at address nm as shown in FIG. 10.

Figure 11:
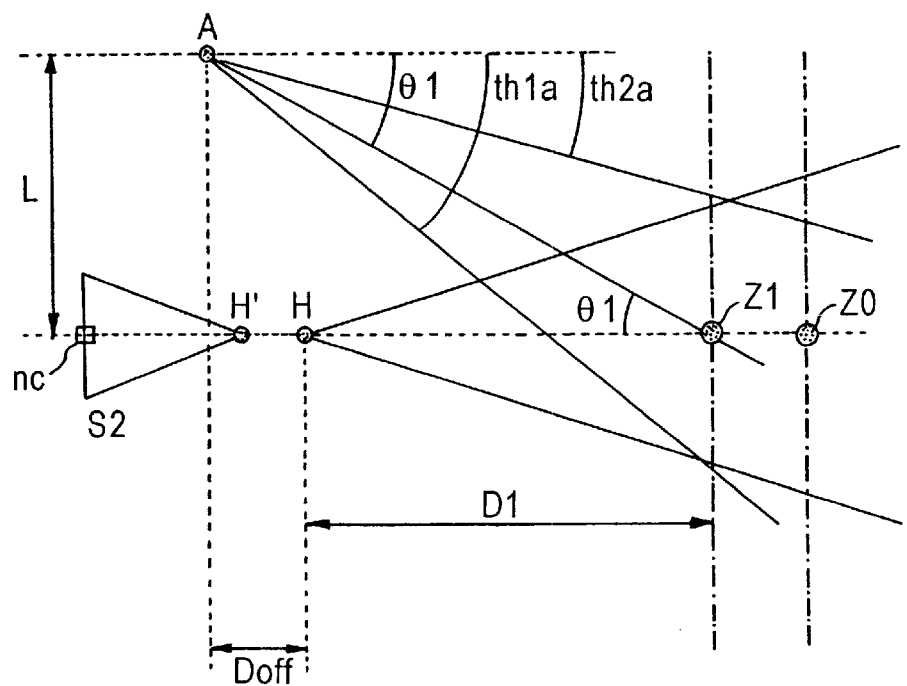
FIG. 11 illustrates the setting the deflection parameters.
Figure 12:
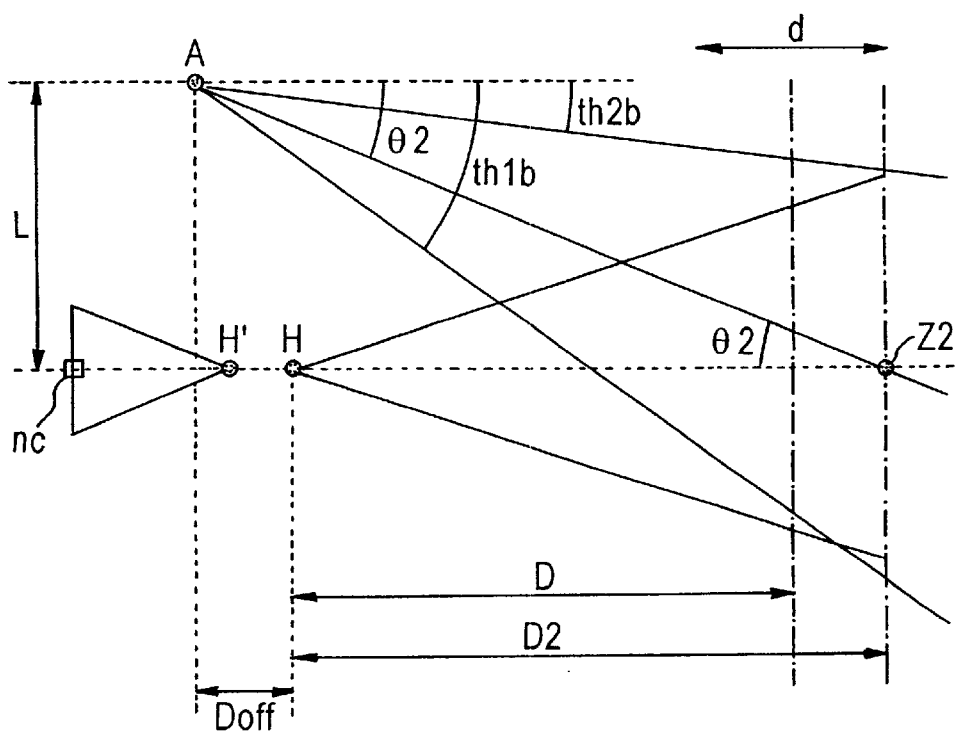
FIG. 12 illustrates the setting the deflection parameters.

FIGS. 11 and 12 illustrate the setting the deflection parameters.

Regarding the second scan, the boundary position Z1 on the front side (left side in the drawing) of the aforesaid measurable distance range d is used as a reference position to determine the scan start angle th1$a$ and the scan end angle th2$a$. Since tanθ1=L/(Doff+D1 ), the following relationship holds:

$$D1 = (L/\tan\theta 1) - Doff \quad (8)$$

The object interval distance D1 is determined from equation 7, and equations 3 and 4 are applied. The scan start angle th1$a$ and the scan end angle th2$a$ can be expressed by equations 9 and 10:

$$th1a = \tan^{-1}[\beta \times pv(np/2+16)+L)/(D1+Doff)] \times 180/\pi \quad (9)$$

$$th2a = \tan^{-1}[-\beta \times pv \ (np/2+16)+L)/(D1+Doff)] \times 180/\pi \quad (10)$$

At this time, the deflection angular speed ωa is:

$$\omega a = (th1a - th2a)/np \quad (11)$$

Regarding the third scan, the boundary position Z2 on the back side (right side in the drawing) of the aforesaid measurable distance range d is used as a reference position to determine the scan start angle th1$b$ and the scan end angle th2$b$. The scan start angle th1$b$ and the scan end angle th2$b$ can be expressed by equations 12 and 13:

$$th1b = \tan^{31 \ 1}[\beta \times pv(np/2+16)+L)/(D1+Doff)] \times 180/\pi \quad (12)$$

$$th2b = \tan^{-1}[-\beta \times pv(np/2+16)+L)/(D1+Doff)] \times 180/\pi \quad (13)$$

At this time, the deflection angular speed ωb is:

$$\omega b = (th1b - th2b)/np \quad (14)$$

As such, the range d' from position Z11 at to position Z22 becomes the measurable distance range of the pixel at address nc by performing three scans at the determined deflection parameters (th1, th2, ω), (th1$a$, th2$a$, ωa), (th1$b$, th2$b$, ωb) (refer to FIG. 8).

Two or more scans maybe performed, or four or more scans maybe performed to broaden the measurable distance range. If the deflection parameters are determined for the fourth and subsequent scans based on the deflection parameters of the second and third scans, the measurable distance range of each scan can be accurately overlapped.

In each scan, an autofocus adjustment is executed to adjust the lens feedout amount Ed in accordance with the object interval distances D1 and D2. The system controller 61 determines the lens feedout amount Ed using a conversion table generated beforehand based on equation 15, and this value is set as the control target value in the lens controller 58.

$$Ed = F(D, fp) \quad (15)$$

Where F represents a function.

In each scan, the variator 514 is fixed in the state set by the user, and the lens notch value fp=fp0. The system controller 61 calculates the lens feedout amounts Ed1 and Ed2 for the second and third scans using the object interval distances D1 and D2 obtained by the first deflection parameters (th1, th2, ω) in the equations 16 and 17.

$$Ed1 = F(D1, fp0) \quad (16)$$

$$Ed2 = F(D2, fp0) \quad (17)$$

Figure 13:
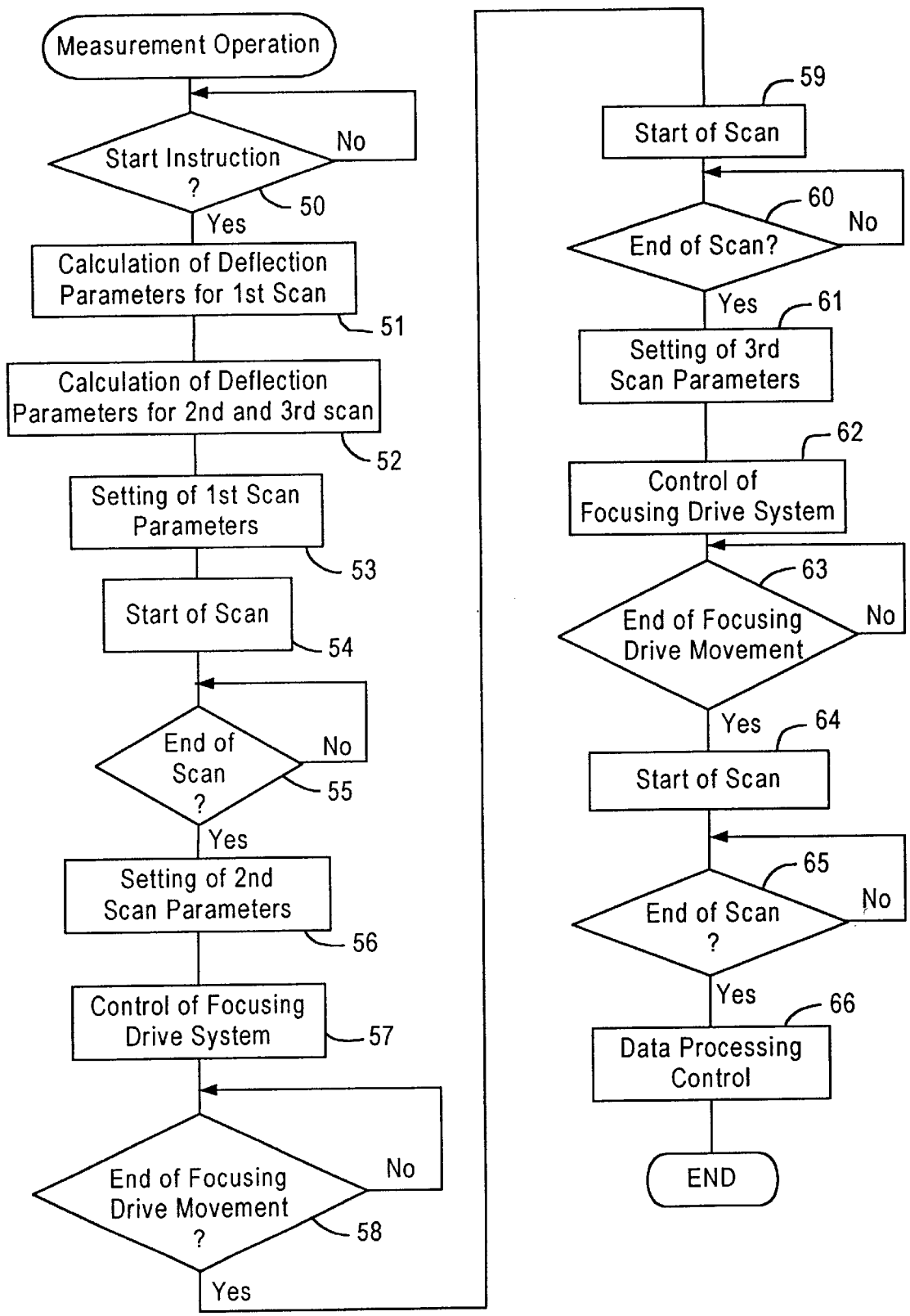
FIG. 13 is an exemplary flow chart illustrating the operation of the three-dimensional camera 2.

FIG. 13 is a flow chart briefly showing the operation of the three-dimensional camera 2. When the measurement start is specified by the shutter button 27, the system controller 61 calculates the deflection parameters for the first scan, and then calculates the deflection parameters for the second and third scans based on the first calculation result (Steps 50–52).

The deflection parameters of the first scan are set, and scanning starts (Steps 53, 54). The projection of the slit light U and the sampling of the amount of received light via sensor 53 are started. The scan is executed until the deflection angle position attains the scan end angle th2.

When the first scan ends, the system controller 61 sets the deflection parameters for the second scan (Steps 55, 56). The lens feedout amount Ed2 is determined for this deflection parameter, and the movement of focusing unit 512 is specified to the focusing drive system 59 via the lens controller 58 (Step 57).

When the movement of the focusing unit 512 ends, the second scan starts (Steps 58, 59). When the second scan ends, the system controller 61 sets the deflection parameters for the third scan, and specifies the movement of the focusing unit 512 (Steps 60–62). When focusing ends, the third scan starts (Steps 63, 64).

When the third scan ends, a distance image representing the three scan measurement results is displayed on the monitor display, and data processing control is executed to output the center ip based on the photoreception data obtained by the scans designated by the user (Steps 65, 66).

Figure 14A:
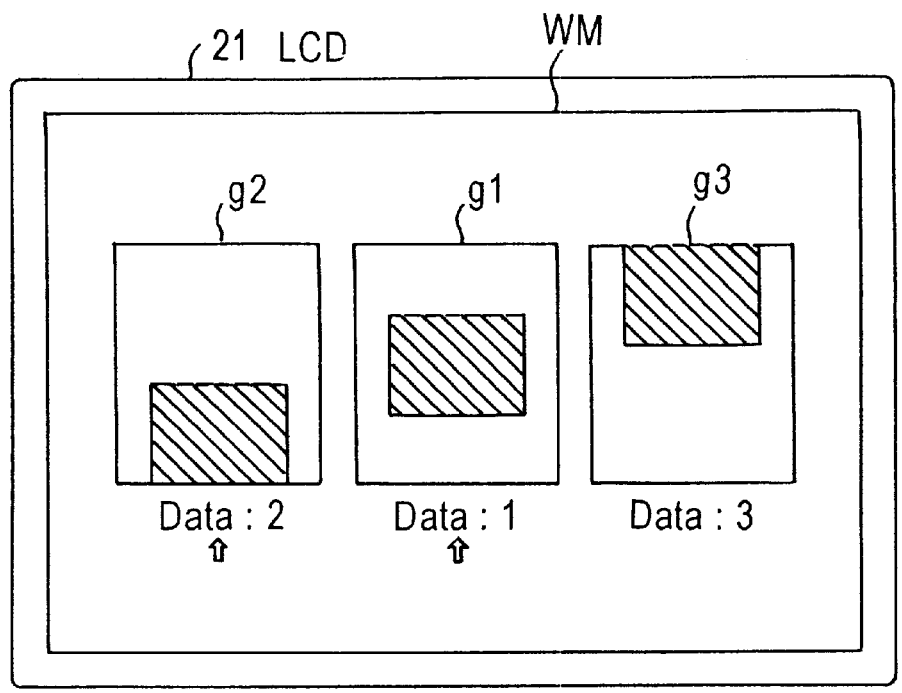
FIG. 14 illustrates an example of the monitor display content.
Figure 14B:
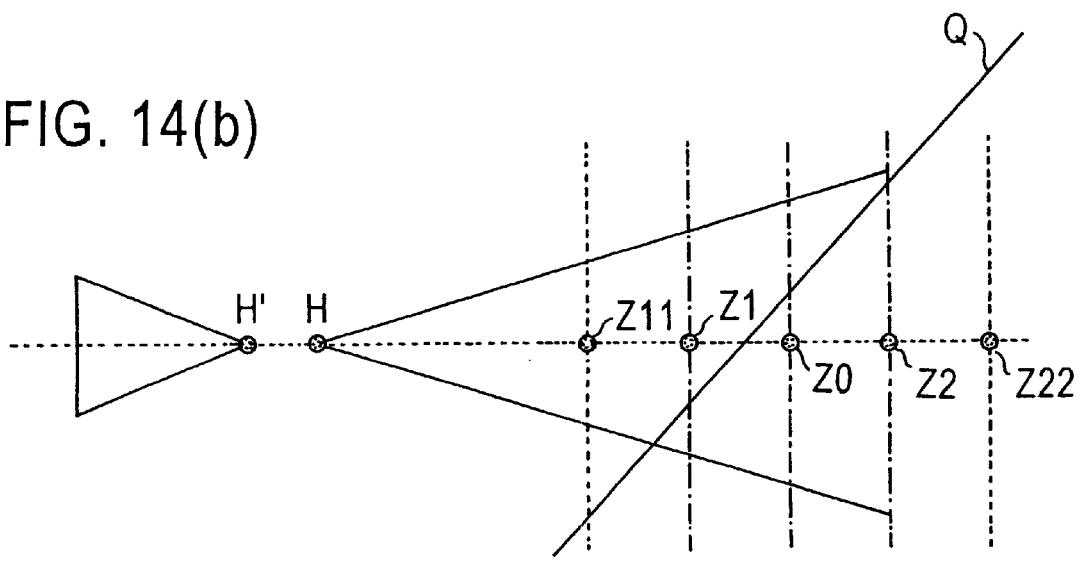

FIG. 14 shows an example of the monitor display content. When the object of measurement is based on the positions Z11 and Z22 as shown in FIG. 14b, part of the object Q is measured in each scan. The three distance images g1, g2, g3 representing the result of each scan are shown aligned from left to right in the sequence of the reference plane position on the liquid crystal display 21, as shown in FIG. 14a. That is, the distance image g1 corresponding to the first scan is shown in the center, the distance image g2 corresponding to the second scan is shown on the left side, and the distance image g3 corresponding to the right scan is shown on the right side.

An operator specifies whether or not the result of a scan is output by means of the cursor button 22 and the selector button 23. Two or more scans may be specified, or one scan may be specified. The first scan and the second scan may be specified as indicated by the upward arrows in the example of FIG. 14.

The specified scan result (i.e., the center ip of a specific number of pixels) is output from the center calculation circuit 73 to the host 3 or the recording medium 4 via the output memory 64 and the SCSI controller 66. At the same time, device information including the specifications of the sensors and the deflection parameters also are output. Table 1 shows the main data transmitted by the three-dimensional camera 2 to the host 3.

TABLE 1

|  |  | Data Content | Data Range |
|---|---|---|---|
| Measurement Data |  | $\Sigma xi$ | 200 × 200 × 13 bit |
|  |  | $\Sigma i.xi$ | 200 × 200 × 18 bit |
| Photographic conditions |  | Image distance b | 0.000~200.000 |
|  |  | Front principal point position FH | 0.00~300.00 |
|  |  | Slit deflection start angle th1 |  |
|  |  | Deflection angular speed ω |  |
| Device Information |  | Measurement pixel number (Number of samples, X, Y in directions) | 1~ |
|  |  | Sensor pixel pitch pu,pv | ~0.00516~ |
|  |  | Projection system posture around X,Y,Z axes) | 0.00~±90.00 |
|  |  | Projection system posture (in X,Y,Z directions) | 0.00~±300.00 |
|  |  | Lens distortion correction coefficient d1, d2 |  |
|  |  | Sensor center pixel u0,v0 | 0.00~256.00 |
| Two-dimensional image |  | R plane | 512 × 512 × 8 bit  0~255 |
|  |  | G plane | 512 × 512 × 8 bit  0~255 |
|  |  | B plane | 512 × 512 × 8 bit  0~255 |

The data processing executed in the measurement system 1 in accordance with the first embodiment is described below.

Figure 15:
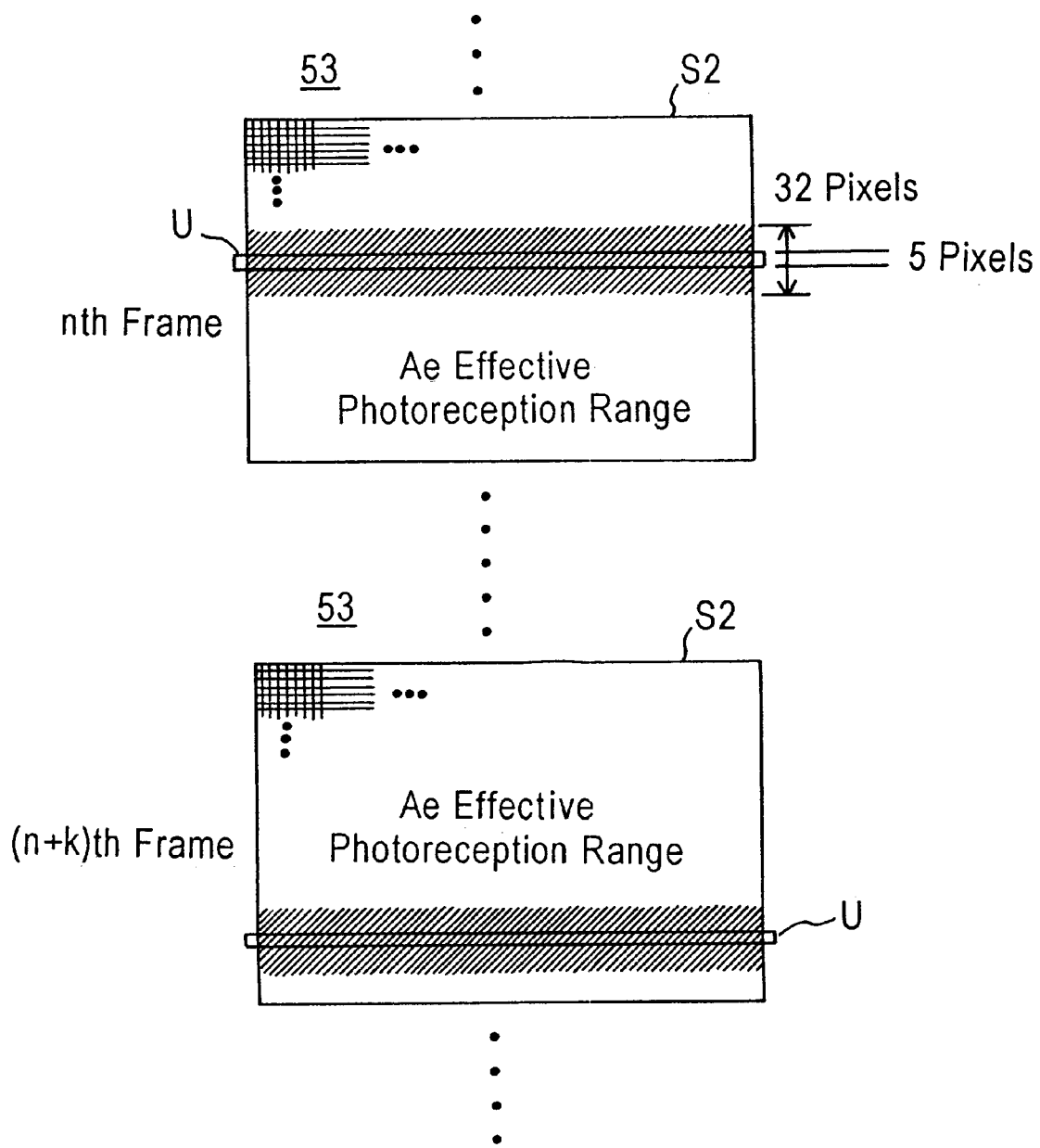
FIG. 15 illustrates an exemplary sensor reading range.

FIG. 15 shows the reading range of the sensor 53. The reading of one frame by the sensor 53 is not executed for the entire image sensing surface S2, but is executed only for the effective photoreception region (band image) Ae of part of the image sensing surface S2 to facilitate high speed processing. The effective photoreception region Ae is a region on the image sensing surface S2 corresponding to the measurable distance range in a specific illumination timing, and shifts one pixel at a time for each frame in conjunction with the deflection of the slit light U. In the present embodiment, the number of pixels in the shift direction of the effective photoreception region Ae is fixed at 32. The method for reading only part of the sensed image of a CCD area sensor is disclosed in U.S. Pat. No. 5,668,631.

Figure 16A:
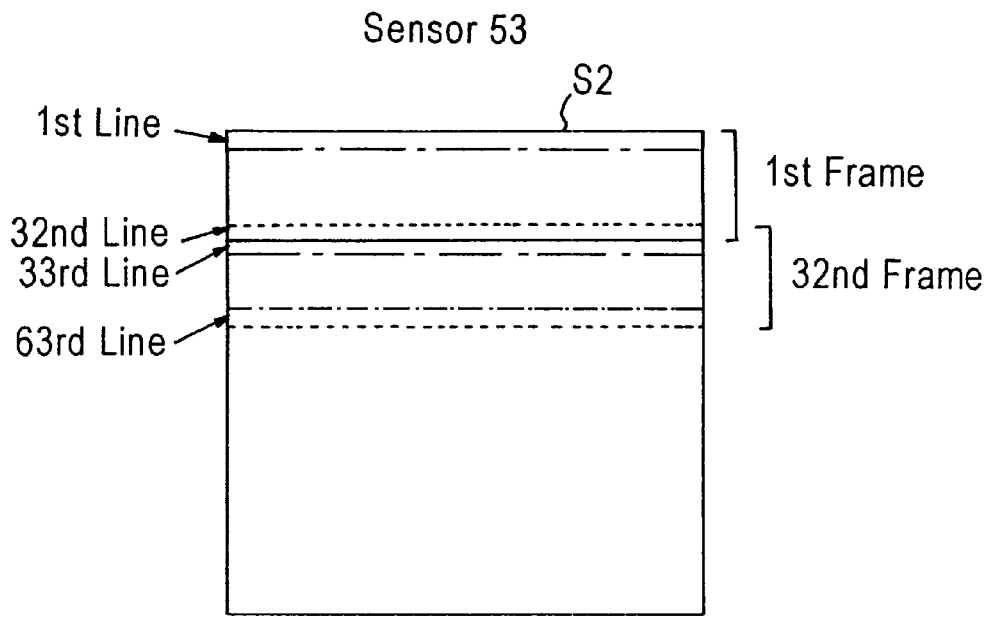
FIG. 16 illustrates the relationship between the frames and line in the image sensing surface of the sensor.
Figure 16B:
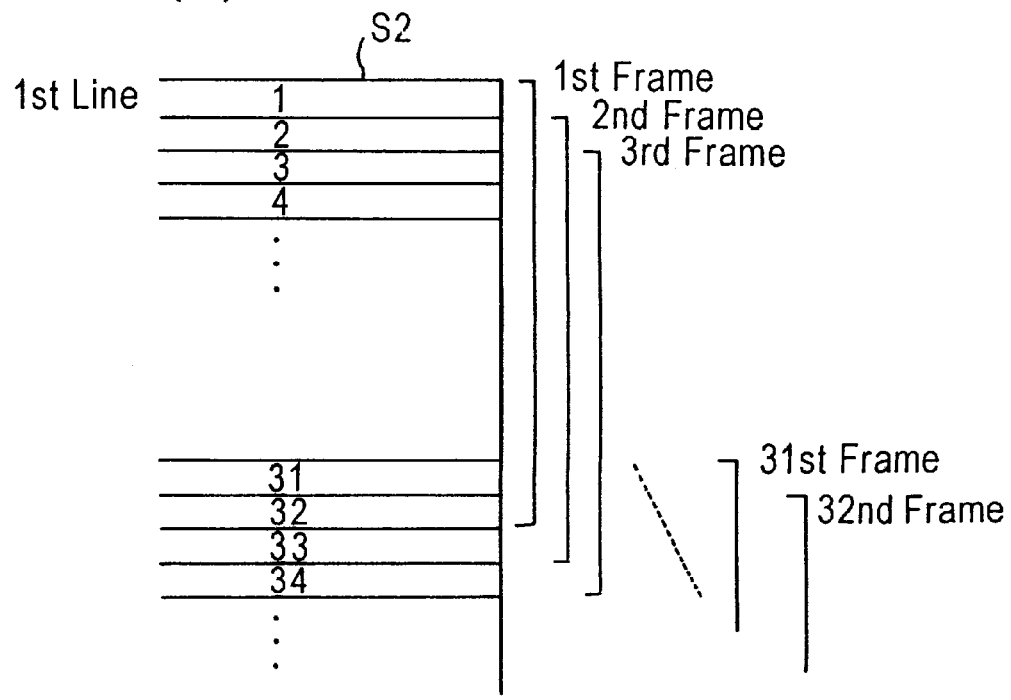
Figure 17:
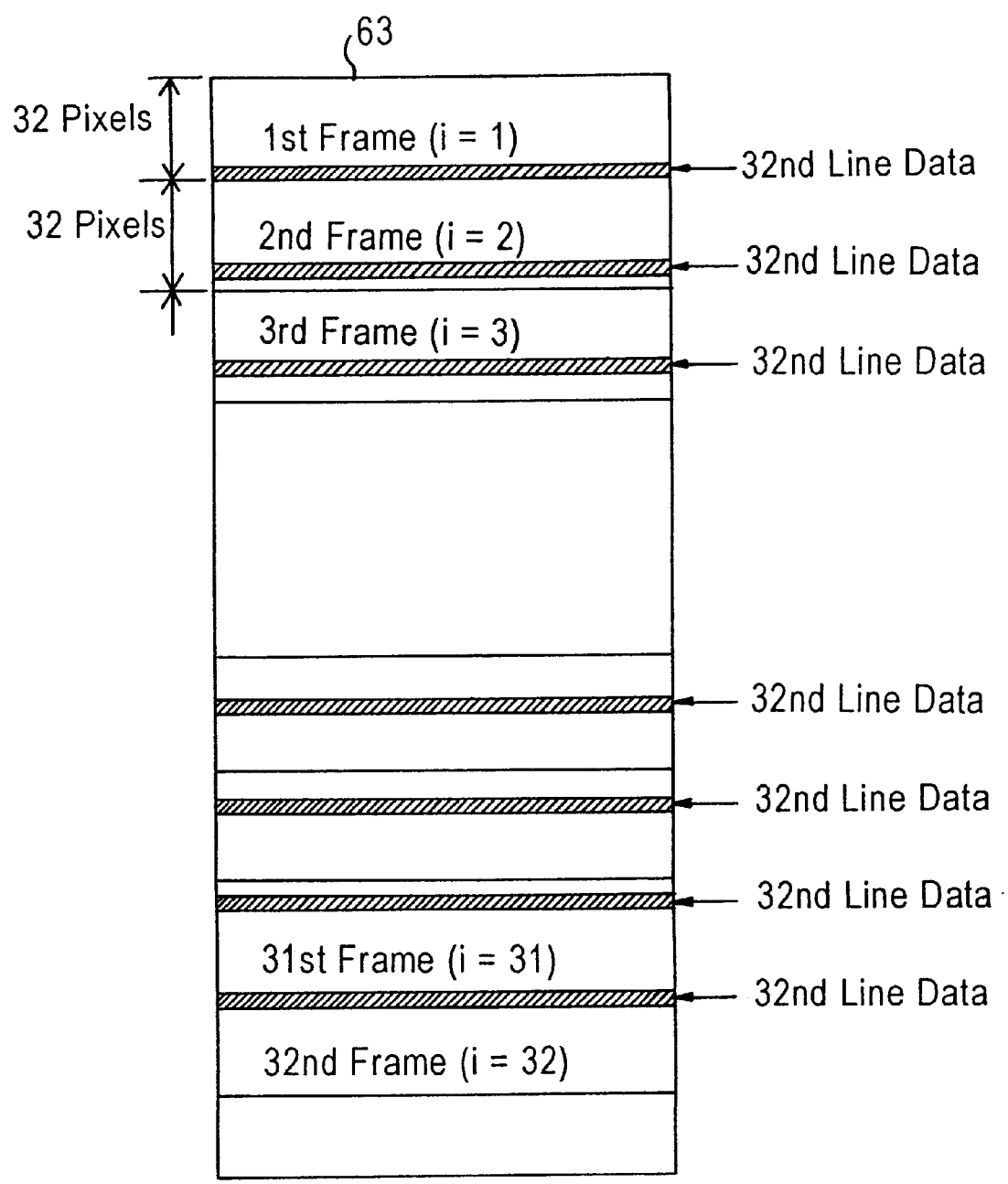
FIG. 17 illustrates an example of the recorded state of the photoreception data of each frame.

FIG. 16 illustrates the relationship between frames and the lines in the image sensing surface S2 of the sensor 53, and FIG. 17 shows the recorded state of the photoreception data of each frame.

As shown in FIG. 16, frame 1, which is the first frame of the image sensing surface S2, includes the photoreception data of 32 lines by 200 pixels from line 1 through line 32. One line comprises 200 pixels. Each frame is shifted one line, i.e., frame 2 includes line 2 through line 33, and frame 3 includes line 3 through line 34. Frame 32 includes line 32 through line 63.

The photoreception data of line 1 through line 32 are sequentially subjected to analog-to-digital (A/D) conversion, and stored in the memory 63 (refer to FIG. 3). As shown in FIG. 17, the photoreception data are stored in the sequence of frame 1, frame 2, frame 3 and the like, and the data of line 32 included in each frame is shifted upward one line in each frame, i.e., the data are the 32 line in frame 1, the 31 line in frame 2, and the like. The sampling of the pixels of line 32 ends by storing the photoreception data of frame 1 through frame 32 in the memory 63. The photoreception data of each pixel at the end of sampling are sequentially read from the memory 63 for the center calculation. The content of the center calculation is described below.

The center ip specifies a position on the surface of the object Q. The closer a position on the surface of the object Q is to the three-dimensional camera 2, the larger the value of the center ip, and the farther away the position is from the camera 2, the smaller the value of the center ip. Accordingly, a distance distribution can be realized by displaying a variable density image using the center ip as density data.

Three-dimensional position calculation processing is executed in the host 3, to calculate the three-dimensional position (coordinates X,Y,Z) of 200×200 sampling points (pixels). The sampling points are the intersections of the camera line of sight (a straight line connecting the sampling point and the front principal point H)and the slit plane (the optical axis plane of the slit light U illuminating the sampling point).

Figure 18:
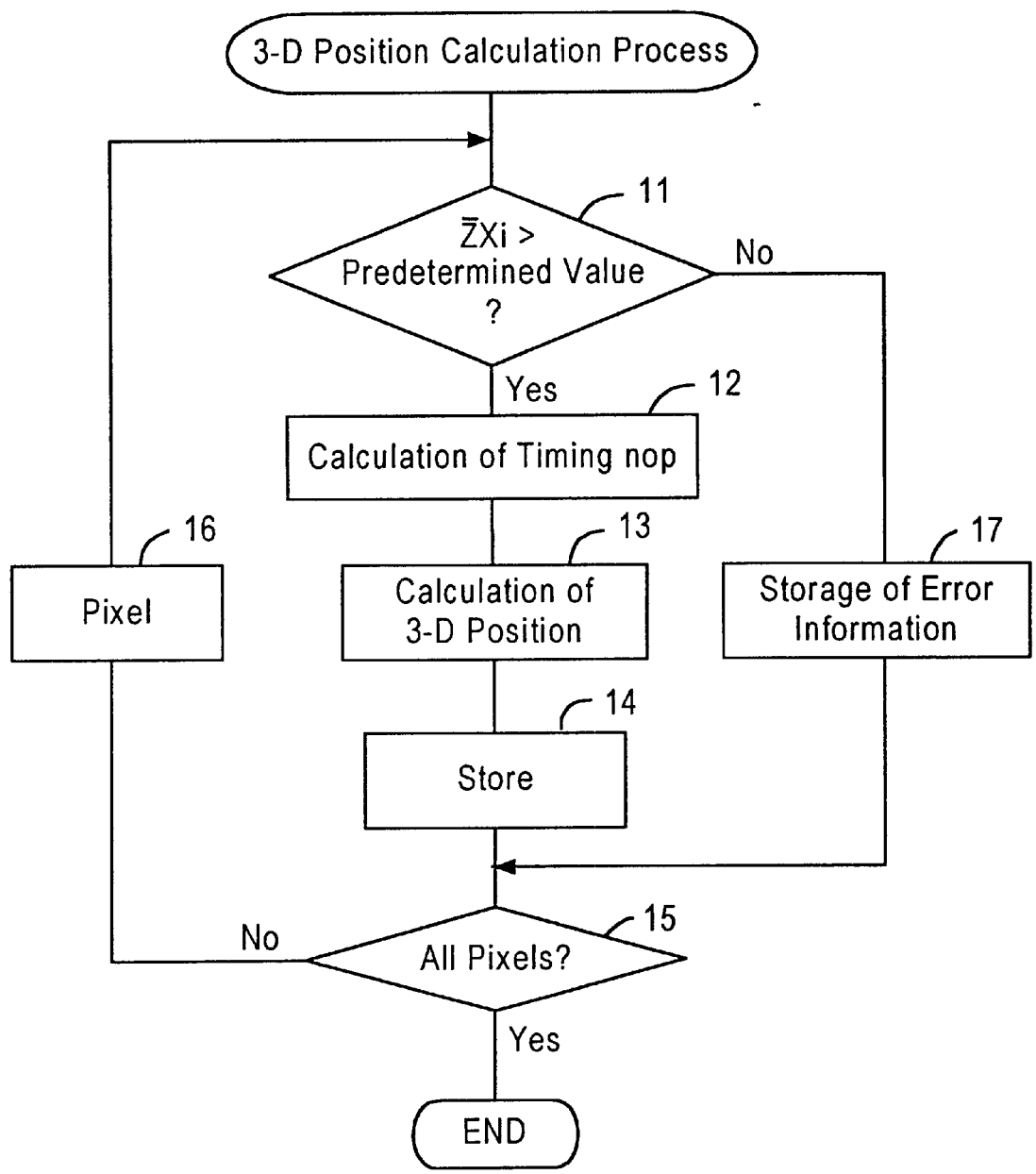
FIG. 18 is a flow chart illustrating the processing sequence of the three-dimensional position calculation by the host.

FIG. 18 is a flow chart showing the processing sequence of the three-dimensional position calculation by the hoist. First, a determination is made as to whether or not the total sum Σxi of xi transmitted from the three-dimensional camera 2 exceeds a predetermined value (Step 11). Since too much error is included when the value xi is small, i.e., when the total sum Σxi of the slit light component does not satisfy a predetermined reference, the three-dimensional position calculation is not executed for that pixel. Data expressing [error] is stored in memory for that pixel (Step 17). When Σxi exceeds a predetermined value, three-dimensional position is calculated for that pixel because there is sufficient luminance.

Before the three-dimensional position calculation, the slit light U passage timing nop is calculated (Step 12). The passage timing nop is calculated by calculating the (Σx·xi)/(Σxi) (where i=1~32), and determining the center ip (time center Npeak), and adding this value to the line number.

Since the calculated center ip is the timing within the 32 frames obtained by the pixel output, the center ip is converted to the passage timing nop from the start of the scan by adding the line number. Specifically, the line number of the pixel of line 32 calculated at the start is [32], and the line number of the next line 33 is [33]. The line number of the line of the target pixel increases by 1 with each one line advance. Other suitable values are also possible. The reason for this is that when calculating a three-dimensional position, suitable set values can be calibrated by canceling the rotation angle the1 around the X axis and the rotation angle the4 around the X axis in the coefficient of equation 20 described below.

Then, the three-dimensional position is calculated (Step 13). The calculated three-dimensional position is stored in a memory area corresponding to the pixel (Step 14), and similar processing is then executed for the next pixel (Step 16). The routine ends when processing is completed for all pixels (Step 15).

The method of calculating the three-dimensional position is described below. The camera line of sight equations are equations 18 and 19:

$$(u-u0)=(xp)=(b/pu)\times[X/(Z-FH)] \tag{18}$$

$$(v-v0)=(yp)=(b/pv)\times[Y/(Z-FH)] \tag{19}$$

Where b represents the image distance, FH represents the front principal point, pu represents the pixel pitch in the horizontal direction of the image sensing surface, pv represents the pixel pitch in the vertical direction in the image sensing surface, u represents the pixel position in the horizontal direction in the image sensing surface, u0 represents the center pixel position in the horizontal direction in the image sensing surface, v represents the pixel position in the vertical direction in the image sensing surface, and v0 represents the center pixel position in the vertical direction in the image sensing surface.

The slit plane equation 20 is shown below.

$$\begin{bmatrix} \cos(the3) & -\sin(the3) & 0 \\ \sin(the3) & \cos(the3) & 0 \\ 0 & 0 & 1 \end{bmatrix} \times \begin{bmatrix} \cos(the2) & 0 & \sin(the2) \\ 0 & 1 & 0 \\ -\sin(the2) & 0 & \cos(the2) \end{bmatrix} \times$$

$$\begin{bmatrix} 1 & 0 & 0 \\ 0 & \cos(the1+the4\cdot nop) & -\sin(the1+the4\cdot nop) \\ 0 & \sin(the1+the4\cdot nop) & \cos(the1+the4\cdot nop) \end{bmatrix} \times$$

$$\begin{bmatrix} 0 \\ 1 \\ 0 \end{bmatrix} [X \quad Y-L \quad Z-s] = 0$$

(20)

Where the1 represents the rotation angle around the X axis, the2 represents the incline angle around the Y axis, the3 represents the incline angle around the Z axis, the4 represents the angular speed around the X axis, nop represents the passage timing (center ip+line number), L represents the base line length, and s represents the offset of origin point A.

The geometric aberration is dependent on the field angle. Distortion is generated in a subject with the center pixel as the center. Accordingly, the amount of distortion is expressed as a function of the distance from the center pixel. In this case, the distance approaches a cubic function. The secondary correction coefficient is designated d1 and the tertiary correction coefficient is designated d2. After correction, the pixel positions u' and v' are applied to equations 21 and 22:

$$u'=u+d1\times t2^2\times(u-u0)/t2+d2\times t2^2\times(u-u0)/t2 \tag{21}$$

$$v'=v+d1\times t2^2\times(v-v0)/t2+d2\times t2^2\times(v-v0)/t2 \tag{22}$$

where:

$$t2=(t1)^{-2} \text{ and, } t1=(u-u0)^2+(v-v0)^2$$

A three-dimensional position which considers aberration can be determined by substituting u' for u and v' for v in equations 18 and 19. Calibration is discussed in detail by Onodera and Kanaya, "Geometric correction of unnecessary images in camera positioning," The Institute of Electronics, Information and Communications Engineers Research Data PRU 91-113, and Ueshiba, Yoshimi, Oshima, et al., "High precision calibration method for rangefinder based on three-dimensional model optical for optical systems," The Institute of Electronics, Information and Communications Engineers Journal D-II, vol. J74-D-II, No. 9,, pp. 1227–1235, Sept., 1991.

Although the object interval distance D is calculated a passive type measurement detecting the position of the focusing unit and the zoom unit in the aforesaid embodiment, it is also possible to use an active type measurement to calculate the object interval distance using a trigonometric survey method by a preliminary measurement by projecting the slit light U at a predetermined angle and detecting the incidence angle. Furthermore, the deflection parameters may be set based on the object interval distance preset without measurement, or based on an object interval distance input by a user.

A mode may be provided for performing only a single scan, so as to allow a user to switch between the single scan mode and a mode performing a plurality of scans. The calculation to determine the coordinates from the center ip may also be executed within the three-dimensional camera 1. Using this construction, a function may be provided to analyze the results of a single scan to automatically determine whether or not two or more scans are necessary, and execute a plurality of scans only when required a construction may also be used to allow the host to calculate the center ip by transmitting the data $\Sigma xi \cdot xi$, and $\Sigma xi$ for each pixel as measurement results to the host 3.

Second Embodiment

Figure 19:
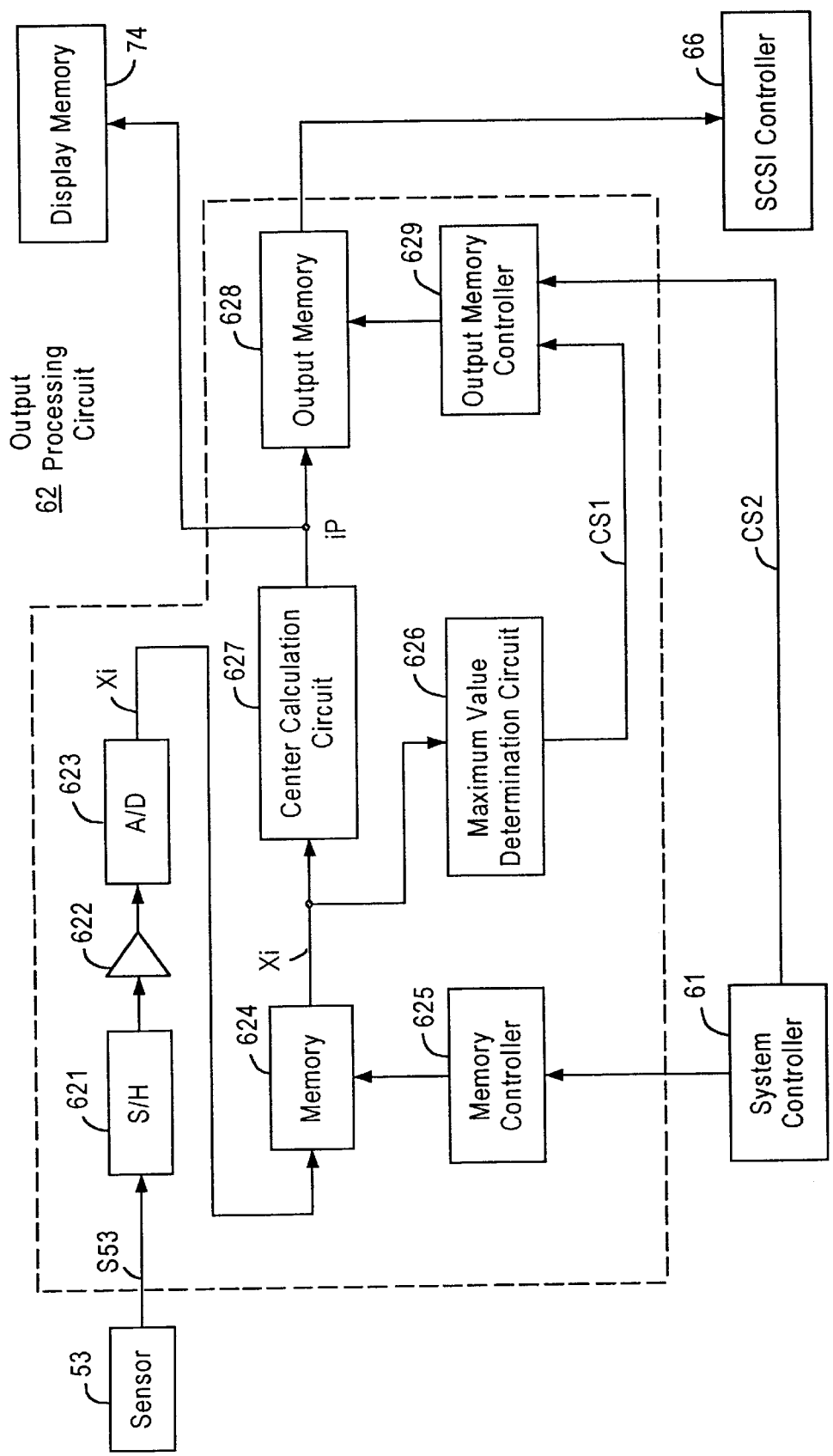
FIG. 19 is an exemplary schematic view of the zoom unit for photoreception.

FIG. 19 is a block diagram of the output processing circuit 62 in accordance with a second embodiment of the present invention. It is noted that the output processing circuit 62 illustrated in FIG. 19 represents a modified embodiment of the output processing circuit 901 illustrated in FIG. 3.

The photoelectric conversion signals S53 output from the sensor 53 are placed on a sampling hold by the sampling hold circuit 621, amplified by a predetermined amplification factor by the amplification circuit 622, and subsequently converted to 8-bit photoreception data Xi by the analog-to-digital (A/D) converter 623. The photoreception data Xi are temporarily stored in a memory 624, and transmitted via a predetermined timing to the maximum value determination circuit 626 and the center calculation circuit 627. The photoreception data Xi of 32 frames are recorded in the memory 624. In this way, the center is calculated for each pixel using a plurality of photoreception data Xi (32 items in the present example) obtained by shifting the image sensing cycle each sensor drive cycle. The memory address specification of the memory 624 is controlled by the memory controller 625. The system controller 61 fetches the photoreception data of a predetermined pixel through a data bus (not shown in the drawings) in a preliminary measurement. The center calculation circuit 627 calculates the center ip forming the basis of the three-dimensional position calculation by the host computer 3, and transmits the calculation result to the output memory 628. The maximum value determination circuit 626 outputs a control signal CS1 representing the suitability of the center ip for each pixel. The output memory controller 629 controls the writing of the center ip to the output memory 629 in accordance with the control signal CS1. When a control signal CS2 output from the system controller 61 specifies masking of the control signal CS1, the center ip is written to memory regardless of the control signal CS1. The output memory controller 629 is provided with a counter for address specification.

Figure 20:
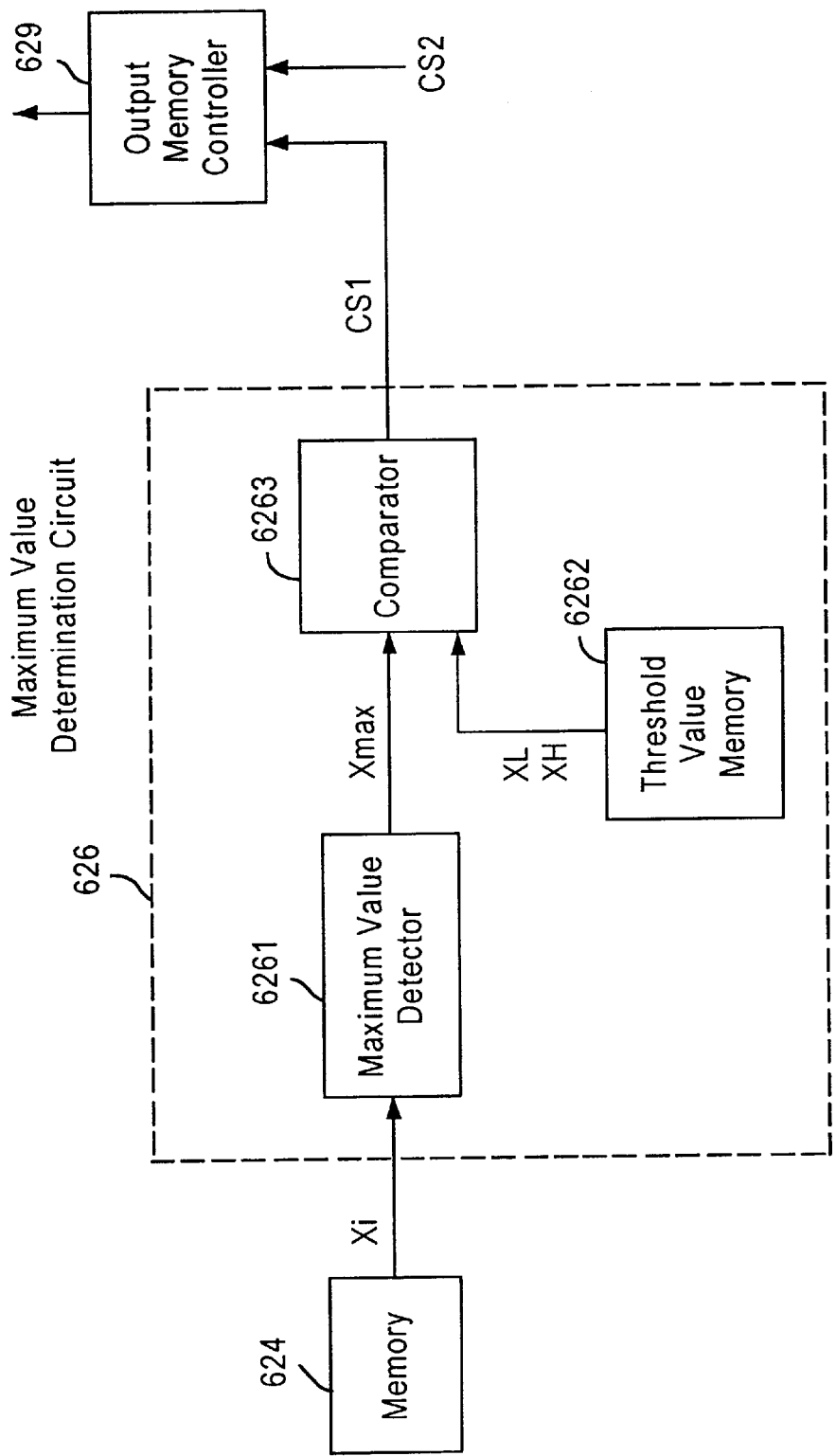
FIG. 20 illustrates the principle for calculating a three-dimensional position in the measuring system.

FIG. 20 is an exemplary block diagram of the maximum value determination circuit 626. The maximum value determination circuit 626 comprises a maximum value detector 6261, a threshold value memory 6262, and a comparator 6263. The 32 items of photoreception data Xi per pixel read from the memory 624 are input to the maximum value detector 6261. The maximum value detector 6261 detects and outputs the maximum value Xmax among the 32 items of photoreception data Xi per pixel. The maximum value Xmax is compared to two threshold values XL and XH by the comparator 6263, and the comparison result is output as the control signal CS1. The threshold values XL and XH are fixed values stored in the threshold memory 6262.

The operation of the three-dimensional camera 2 and the host computer 3 and sequence of measurement in accordance with the second embodiment are now described.

The three-dimensional camera 2 performs measurement sampling at 200×262 sampling points. That is, the image sensing surface S2 has 262 pixels in the width direction of the slit light U, and the actual number of frames is 231.

A user (photographer) determines the camera position and direction, and set the field angle while viewing color monitor image displayed on the liquid crystal display 21. At this time a zooming operation is performed if necessary. Also at this time focusing is accomplished either manually or automatically by moving the focusing unit within the zoom unit 51, and the approximate object interval distance (do) is measured during the focusing process.

When a user presses the shutter button 27, a preliminary measurement is performed prior to the main measurement. In the preliminary measurement, the system controller 61 estimates the output of the semiconductor laser 41 (slit light intensity), and the deflection conditions (scan start angle, scan end angle, deflection angular speed) of the slit light U for the main measurement.

Figure 21:
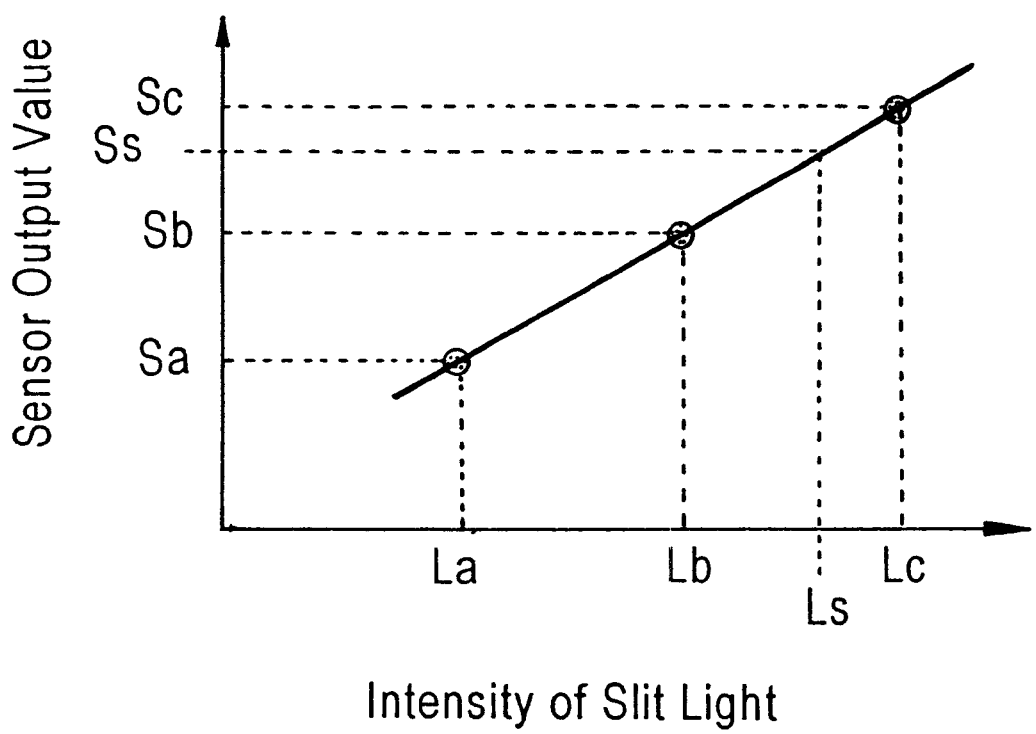
FIG. 21 illustrates an exemplary positional relationship between the object and the principal point of the optical system.

FIG. 21 illustrates a summary of the estimation of the slit light intensity Ls in the preliminary measurement. The summary of the estimation of the slit light intensity is described below. The projection angle is set so that the reflected light is received in the center of the sensor 53 in the presence of a flat surfaced object using an object interval distance (do) estimated by the focusing operation. The slit light U is projected consecutively total of three times at three intensity levels La, Lb, Lc at the set projection angle, the output of the sensor 53 is sampled, and the relationship between each intensity La, Lb, Lc and the output of the sensor 53 is determined. Then, the slit light intensity Ls is determined for the optimum value Ss of the sensor 53 output based on the determined relationships. The sampling of the output of the sensor 53 does not target the totality of the image sensing surface S2, but rather targets only a part of the surface.

In the estimation of the deflection conditions, the object interval distance (d) is estimated by the trigonometric survey method based on the projection angle of the slit light U at intensities La, Lb<Lc, and the receiving position of the slit light U. Then, the scan start angle, scan end angle, and deflection angular speed are calculated so as to obtain a measurement result of a predetermined resolution based on the object interval distance (d), optical conditions of the received light, and the operating conditions of the sensor 53. The preliminary measurement continues until a suitable preliminary measurement result is obtained, and then the main measurement is executed.

Figure 22:
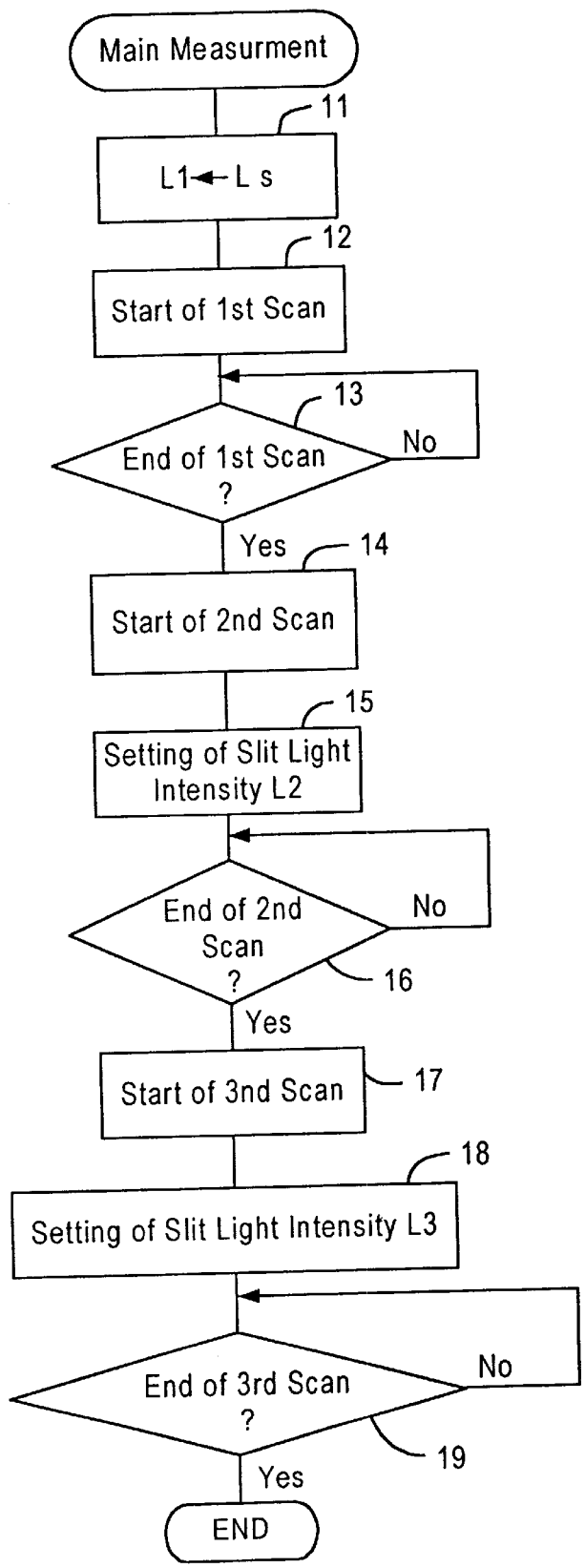
FIG. 22 is an exemplary flow chart showing the operation of the main measurement.

FIG. 22 is an exemplary flow chart showing the operation of the main measurement. In the main measurement of the second embodiment, an object is scanned a total of three times. The deflection conditions of the slit light U are identical in all scans, but the slit light intensity is different in each scan.

The slit light intensity L1 of the first scan is the slit light intensity La determined previously by the preliminary measurement. The slit light intensity L1 is set as the operating condition of the semiconductor laser 41 (Step 11), and the slit light U is projected in a range from the scan start angle to the scan end angle (Steps 12, 13). Similarly, the slit light intensity L2 is set, and a second scan performed (Steps 14 to 16), then the slit light intensity L3 is set, and a third scan is performed (Steps 17 to 19).

Data loss in the processing performed by the output processing circuit 62 described later can be prevented by scanning at the slit light intensity Ls. Data loss is related to the reflectivity distribution of the object, the number of set levels of slit light intensity (number of scans), and the maximum value of the photoreception data of each pixel.

Figure 23:
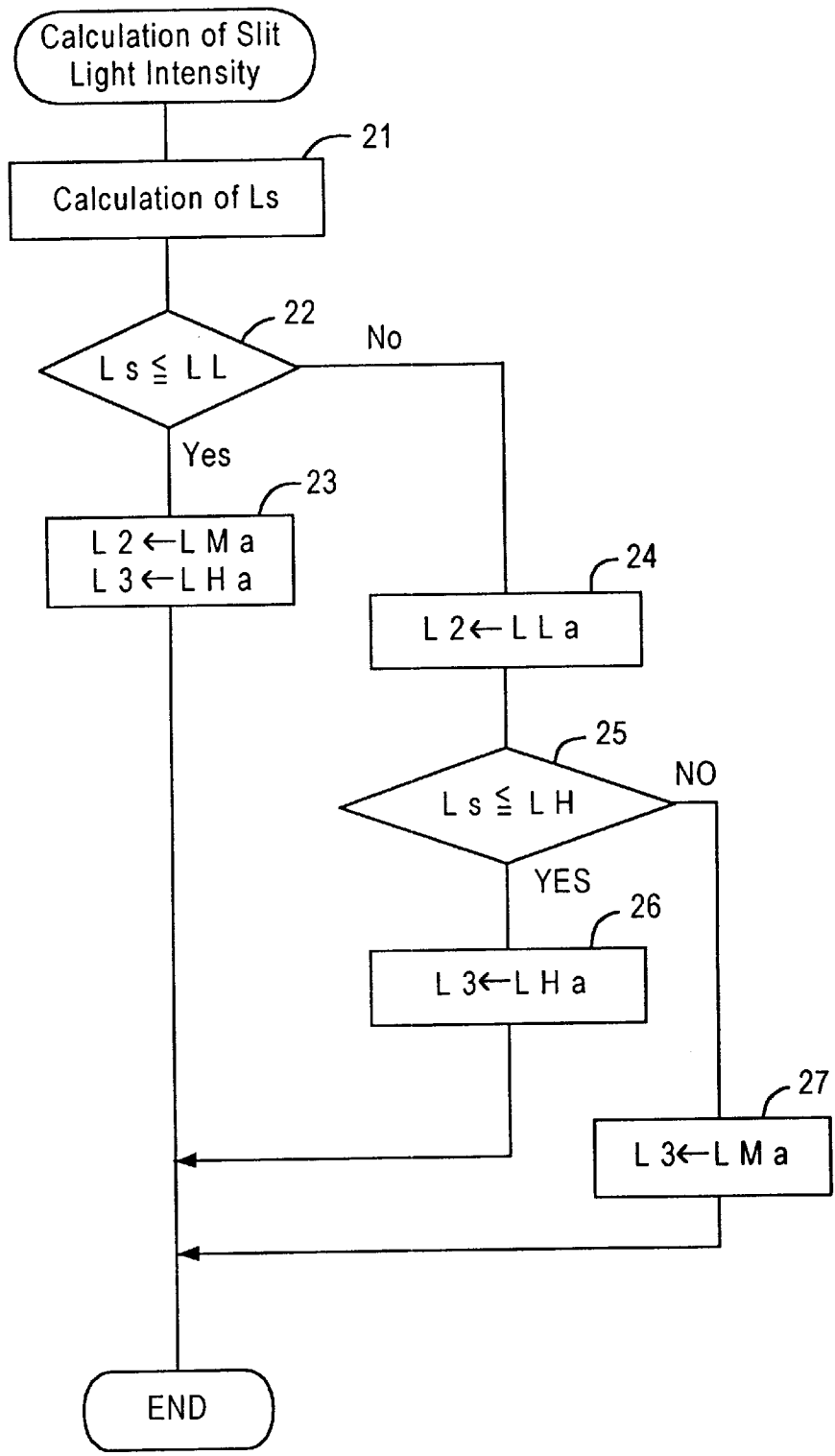
FIG. 23 is an exemplary flow chart of the calculation of the slit light intensity suitable for the main measurement.
Figure 24:
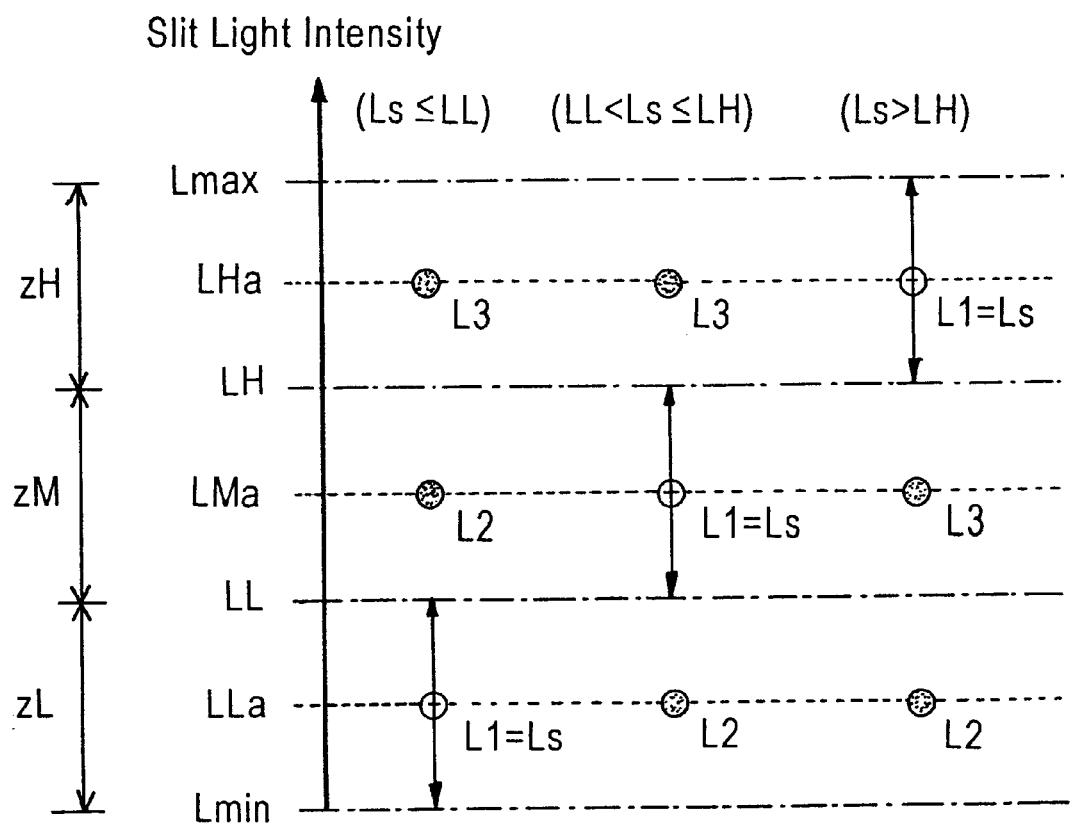
FIG. 24 shows exemplary settings of the slit light intensity.

FIG. 23 is an exemplary flow chart of the calculation of the slit light intensity suitable for the main measurement, and FIG. 24 shows exemplary settings of the slit light intensity. Initially, the slit light intensity Ls is calculated based on the preliminary measurement as previously described (Step 21), and the slit light intensities L2 and L3 are determined accordance with the magnitude relationship between the obtained value and the previously determined threshold values LL and LH. The threshold value LL is the value on the border of the low side among the two borders circumscribing the intensity range zL, zM, zH of three levels of low (L), medium (M), high (H) of the variable range (minimum value Lmin to maximum value Lmax) of the slit light intensity. The threshold value LH is the border value on the high side.

When Ls≦LL, the light intensity L2 is set as the average value LMa of the intensity range zM, and the intensity value L3 is set as the average value LHa of the intensity range zH (Steps 22, 23). When Ls>LL, the intensity value L2 is set as the average value LLa of the intensity range zL (Step 24), and the intensity value L3 is set as described below.: If Ls≦LH, the value L3 is set as LHa (Steps 25, 26), and if Ls>LH, the value L3 is set as LMa (Step 27). That is, each of the three intensity ranges zL, zM, zH are selected one by one as the slit light intensity. Each value LL, LH, LLa, LHa are expressed by the following equations.

$$LL=(Lmax-Lmin)/3+Lmin \quad (23a)$$

$$LH=2(Lmax-Lmin)/3+Lmin \quad (23b)$$

$$LLa=(LL-Lmin)/2+Lmin \quad (23c)$$

$$LMa=(LH-LL)/2+LL \quad (23d)$$

$$LHa=(Lmax-LH)/2+LH \quad (23e)$$

In each of the total of three scans at the slit intensities set as described above, the previously mentioned output processing circuit 62 calculates the center ip using a predetermined calculation on the output from the sensor 53, and effectively uses the center ip in the scans of each pixel in accordance with the maximum value Xmax.

FIG. 15 illustrates the reading range of the sensor 53. Reading of one frame by the sensor 53 is accomplished not for the entire image sensing surface S2, but rather the subject is only the effective photoreception area (band-like image) Ae of part of the image sensing surface S2 to allow high speed reading. The effective photoreception area Ae is the area on the image sensing surface S2 corresponding to the measurable distance range of a specific illumination timing, and shifts pixel by pixel for each frame in accordance with the deflection of the slit light U. In the present embodiment, the number of pixels of the effective photoreception area in the shift direction is fixed at 32. The method of reading part of the sensed image by the CCD area sensor is disclosed in Japanese Laid-Open Patent Application No. HEI 7-174536.

As stated above, FIG. 16 illustrates the relationship of the line and frame on the image sensing surface S2 of the sensor 53, and FIG. 17 illustrates the recording state of the photoreception data of each frame.

As shown in FIG. 16, the frame 1 which is the first frame on the image sensing surface S2 contains photoreception data of the 32 (lines) by 200 pixels from line 1 through line 32. The frame 2 is shifted one line only and contains lines 2 through 33, and the frame 3 is shifted one line only and contains lines 3 through 34. The frame 32 contains lines 32 through 63. One line comprises 200 pixels as previously described.

The photoreception information of frame 1 through frame 32 is sequentially converted by an A/D converter and stored in the memory 624 (refer to FIG. 4). As shown in FIG. 17, the photoreception data is stored in the memory 624 in the sequence of frame 1, frame 2, frame 3 and so on, and the data of line 32 included in each frame is shifted up one line per frame so as to be line 32 in frame 1, line 31 in frame 2 and the like. The sampling of each pixel of line 32 ends by storing the photoreception data from frame 1 to frame 32 in the memory 624. The photoreception data of each pixel are sequentially read from the memory 624 after sampling ends to calculate the center.

Referring again to FIG. 6, the center ip is the center on the time axis of the distribution of 32 individual photoreception data obtained by 32 samplings. The 32 individual photoreception data of each pixel are designated by the sample numbers 1 through 32. The no. i sample data is represented by Xi, where i is an integer of 1 through 32. At this time, i represents the frame number of a single pixel after the pixel enters the effective photoreception range Ae.

The center ip of the photoreception data X1 through X32 of numbers 1 through 32 is determined in the same manner as described above.

In the center calculation process, the calculation process becomes inaccurate or impossible when the sampling data near the center ip attains a saturated level or a solid level, there by causing a reduction in the accuracy of the target object position calculation. The three-dimensional camera 2 of the second embodiment performs a plurality of scans at different slit light intensities and selects the scan data wherein the sampling data is not at a saturated level or a solid level among each scan of each pixel so as to accurately calculate the center relative to all pixels.

Figure 25A:
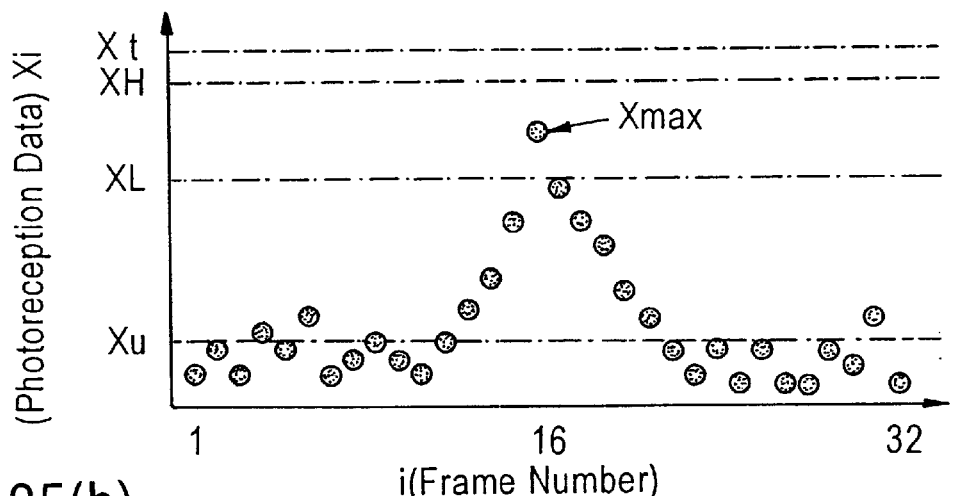
FIGS. 25(a)–(c) illustrate representative examples of the relationship between the maximum value Xmax and the minimum value Xmin of the photoreception data.
Figure 25B:
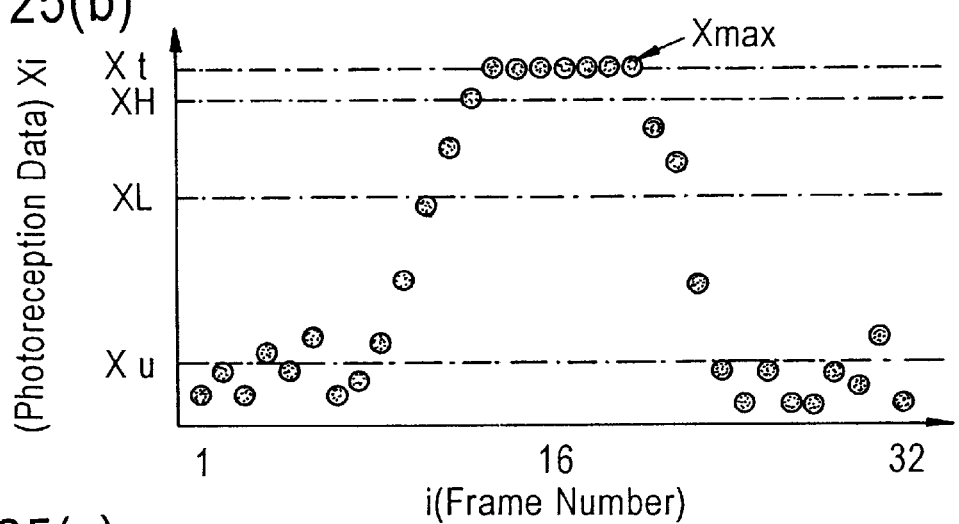
Figure 25C:
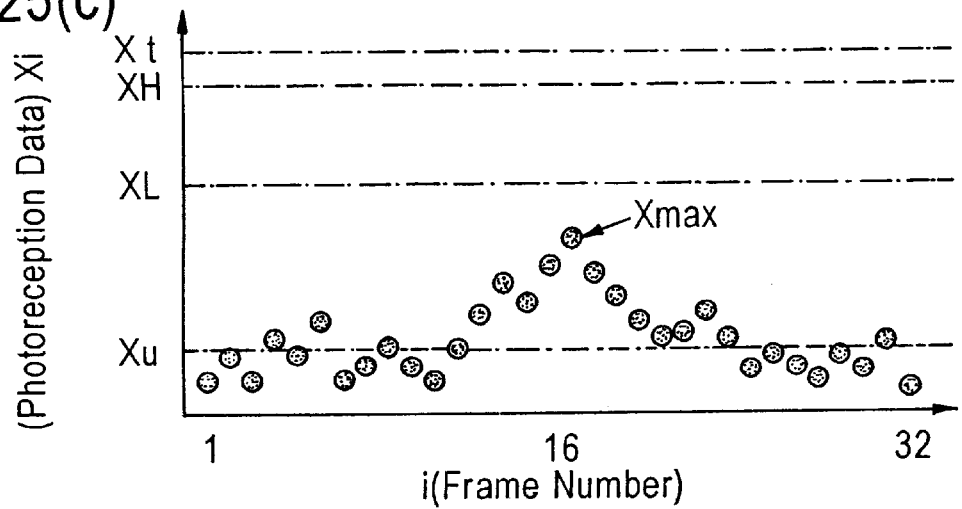

FIGS. 25(a)–(c) illustrate representative examples of the relationship between the maximum value Xmax and the minimum value Xmin of the photoreception data. The threshold values XL and XH are set at values below the saturation level Xt and above the solid level Xu in the operation characteristics of the sensor 53.

FIG. 25(a) shows an instance in which the maximum value Xmax satisfies Equation (24) described later among the sampled photoreception data of each pixel; in this case the center ip is permitted to be written to the output memory 628.

FIG. 25(b) shows an instance in which the maximum value Xmax exceeds the threshold value XH (tolerance upper limit), and the photoreception data are saturated. In this case, since there is concern that the center calculation cannot be performed accurately, the center ip is prohibited from being written to the output memory 628.

FIG. 25(c) shows an instance when the maximum value Xmax is less than the threshold value XL (tolerance lower limit); the photoreception data approach the solid level thereby greatly increasing the effects of background light and intra circuit noise, and narrowing the width of the photoreception data distribution. Since there is concern that the center calculation cannot be accurately performed in this case also, the center ip is not permitted to be written to the output memory 628.

The comparator 6263 mentioned in FIG. 20 executes a comparison calculation to determine whether or not the input maximum value Xmax satisfies the conditions of Equation (24), and outputs a control signal CS1.

$$XL < Xmax < XH \qquad (24)$$

When the control signal CS1 permits the center ip to be written to the output memory 628 when the maximum value Xmax of each pixel satisfies Equation (24), and prohibits the center ip from being written to memory when Equation (24) is not satisfied. The output memory 628 is provided with a capacity capable of holding the center of all pixels of the sensor 53.

Figure 26:
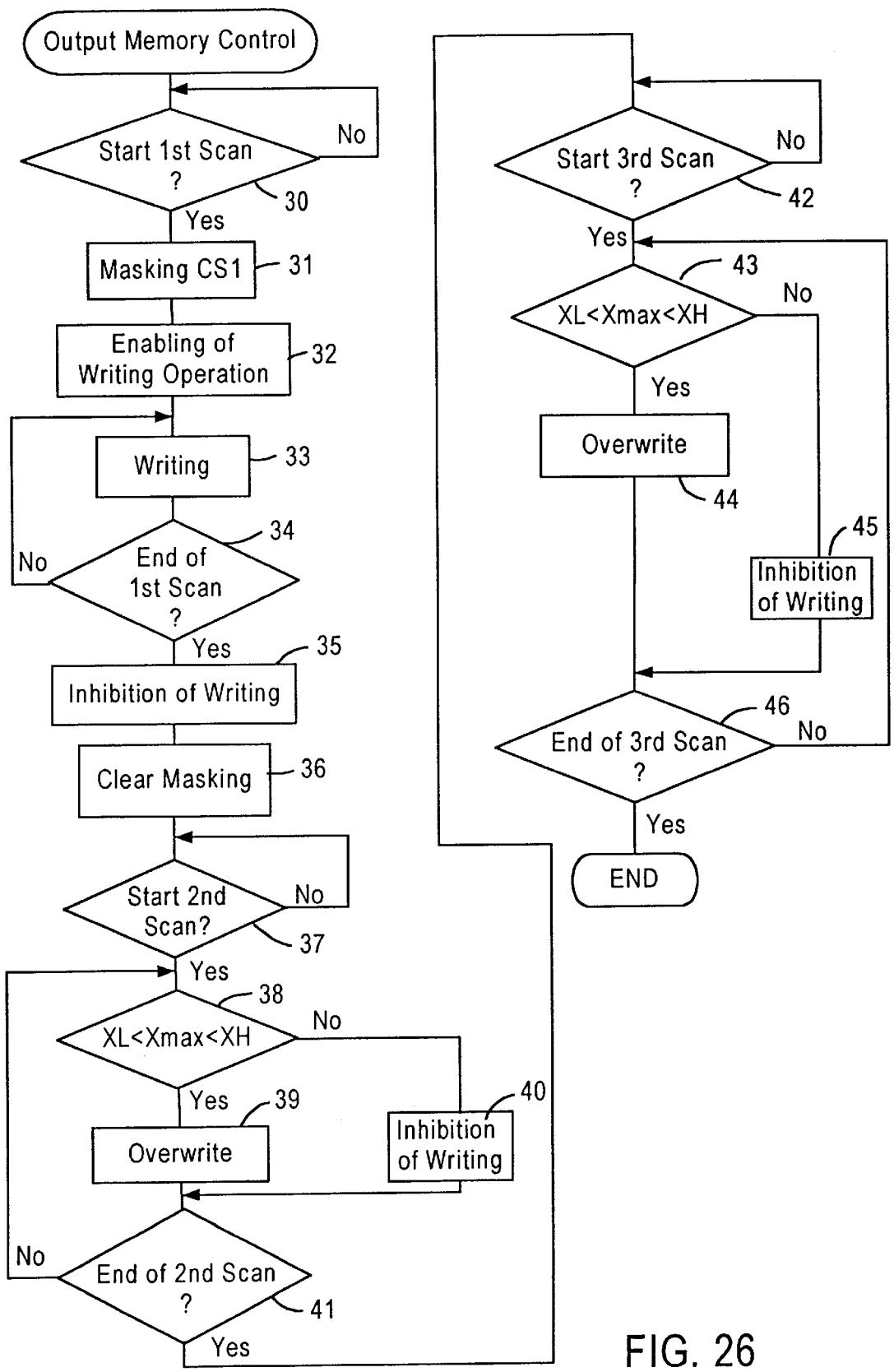
FIG. 26 is an exemplary flow chart of the output memory control.

FIG. 26 is an exemplary flow chart of the output memory control. When the first scan of the main measurement starts (Step 30), the control signal CS1 is masked by the control signal CS2 in the output memory controller 629 (Step 31), and the center ip of all pixels are permitted to be written to the output memory 628 (Step 32). When the first scan for writing the center ip of all pixels to the output memory 628 ends (Step 33, Step 34), writing to the output memory 628 is prohibited (Step 35), and the mask on the control signal CS1 is cleared (Step 36). In the second scan, the maximum value Xmax is compared to the threshold value XL and XH, and the writing to the output memory 628 is either permitted or prohibited in accordance with the comparison result (Steps 37–40). When writing is permitted, the center ip obtained in the second scan is written to the output memory 628. In the third scan, the center ip is written to the output memory 628 in the same manner as in the second scan.

As described above, the center ip of each pixel calculated in each of a plurality of scans in the output processing circuit 62 is up dated for each scan if the maximum value Xmax satisfies the conditions of Equation (24). When pixels do not satisfy the conditions of Equation (24) in all scans, data loss occurs. In the present embodiment, the center calculation result is written to the output memory 628 for all pixels in the first scan to prevent data loss. The slit light intensity Ls in the first scan is optimized relative to the reflectivity of the center of the object in the preliminary measurement as previously mentioned. Loss of data for other areas near the reflectivity of the center of the object is prevented by executing the first scan at the slit light intensity Ls.

Although the slit light intensity is switched to perform three scans in the main measurement by the three-dimensional camera 2 of the present example, the accuracy of the center calculation can be improved by selecting the slit light intensity appropriate to the reflectivity of each part of the target object by increasing the number of scans and the number of levels of the slit light intensity.

Figure 27:
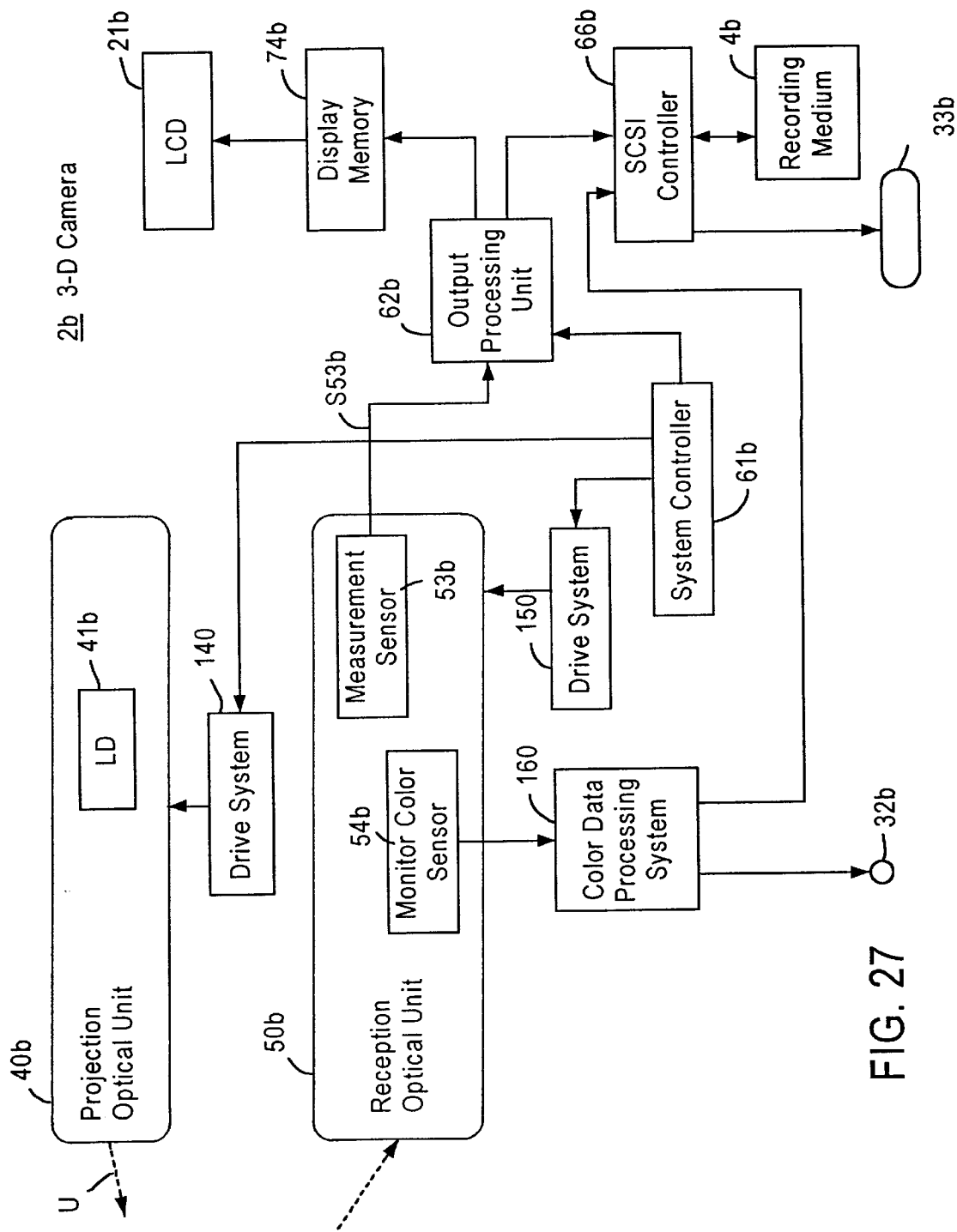
FIG. 27 is an exemplary block diagram illustrating a variation of the three-dimensional camera 2b described above in the foregoing embodiment.

FIG. 27 is an exemplary block diagram illustrating a variation of the three-dimensional camera 2b described above in the foregoing embodiment. In the drawing, items common to the embodiment of FIG. 3 are identified by a "b" appended to their reference number. The external view, basic internal construction, and method of use of the three-dimensional camera 2b are identical to the previously described three-dimensional camera 2 (refer to FIGS. 1 through 3). The description of FIG. 27 is therefore abbreviated.

The optical unit 40b is provided with a semiconductor laser 41b, which emits a slit light U to scan an object which is the measurement target. The optical unit 50b is provided with a measurement sensor 53b and a monitor color sensor 54b, which forms the object image and converts this image to electrical signals. A system controller 61b controls the drive system 140 for operating the optical unit 40b and the drive system 150 for driving the optical unit 50b.

The photoelectric conversion signals S53b obtained by the sensor 53b are transmitted to the output processing circuit 62b. The output processing circuit 62b outputs a distance image to the display memory 74b, and outputs data based on the calculation of the three-dimensional position to the SCSI controller 66b. The distance image is displayed on the liquid crystal display 21b. The photoelectric conversion signals obtained by the color sensor 54b are input to the color data processing system 160. The color data processing system 160 outputs analog image signals to the pin 32b, and transmits digital image data to the SCSI controller 66b. The SCSI controller 66b controls data communications with external devices via the pin 33b, and manages the access to the recording medium 4b.

The characteristics of the three-dimensional camera 2b are described below in terms of the construction and operation of the output processing circuit 62b.

Figure 28:
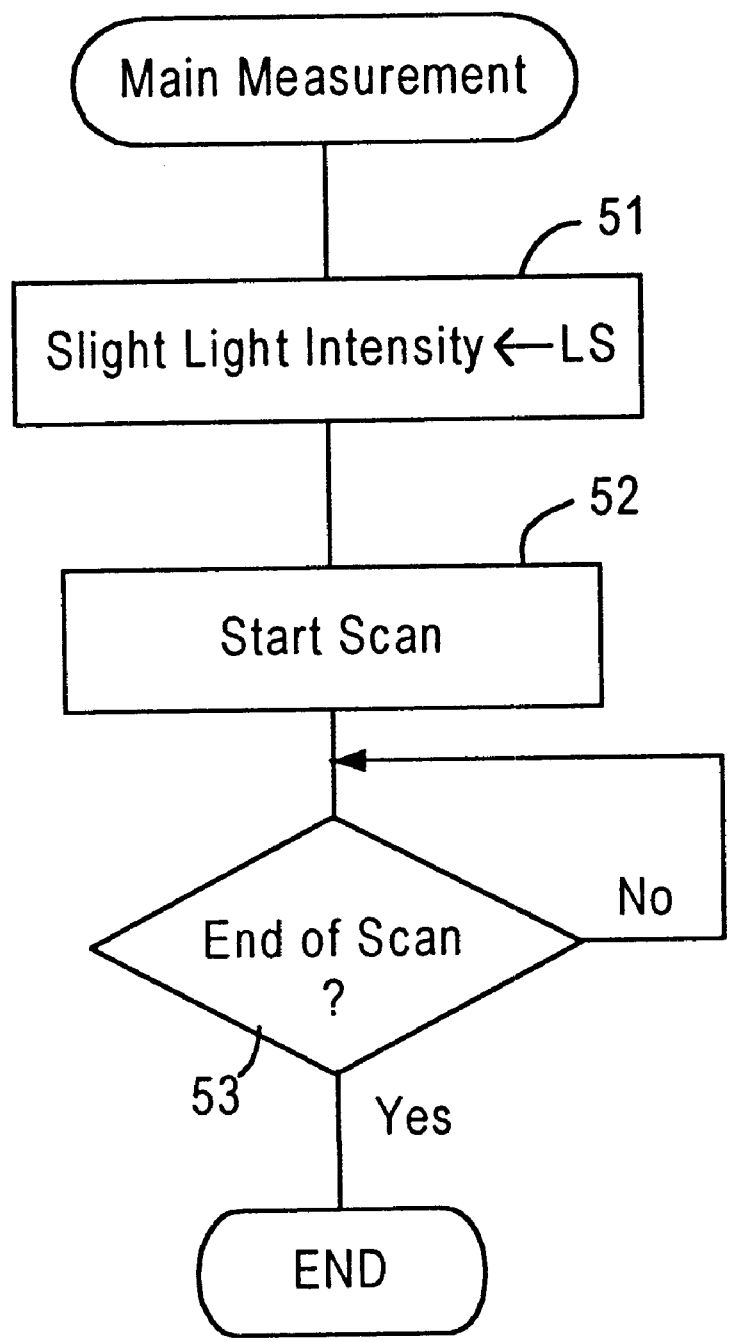
FIG. 28 is an exemplary flow chart of the main measurement executed by the three-dimensional camera 2b.

FIG. 28 is an exemplary flow chart of the main measurement executed by the three-dimensional camera 2b. The three-dimensional camera 2b performs a preliminary measurement in the same sequence as the three-dimensional camera 2, and the result of the preliminary measurement is reflected in the main measurement.

When the process moves from the preliminary measurement to the main measurement, the system controller 61b provides the deflection conditions for the drive system 140, and provides the slit light intensity Ls as an output condition for the semiconductor laser 41b (Step 51). The scan starts to satisfy the scan start angle of the deflection conditions (Step 52), and the scan is executed until the scan end angle is satisfied (Step 53). During the scan, the output processing circuit 62b performs signal processing on the successive photoelectric conversion signals output from the sensor 53b.

Figure 29:
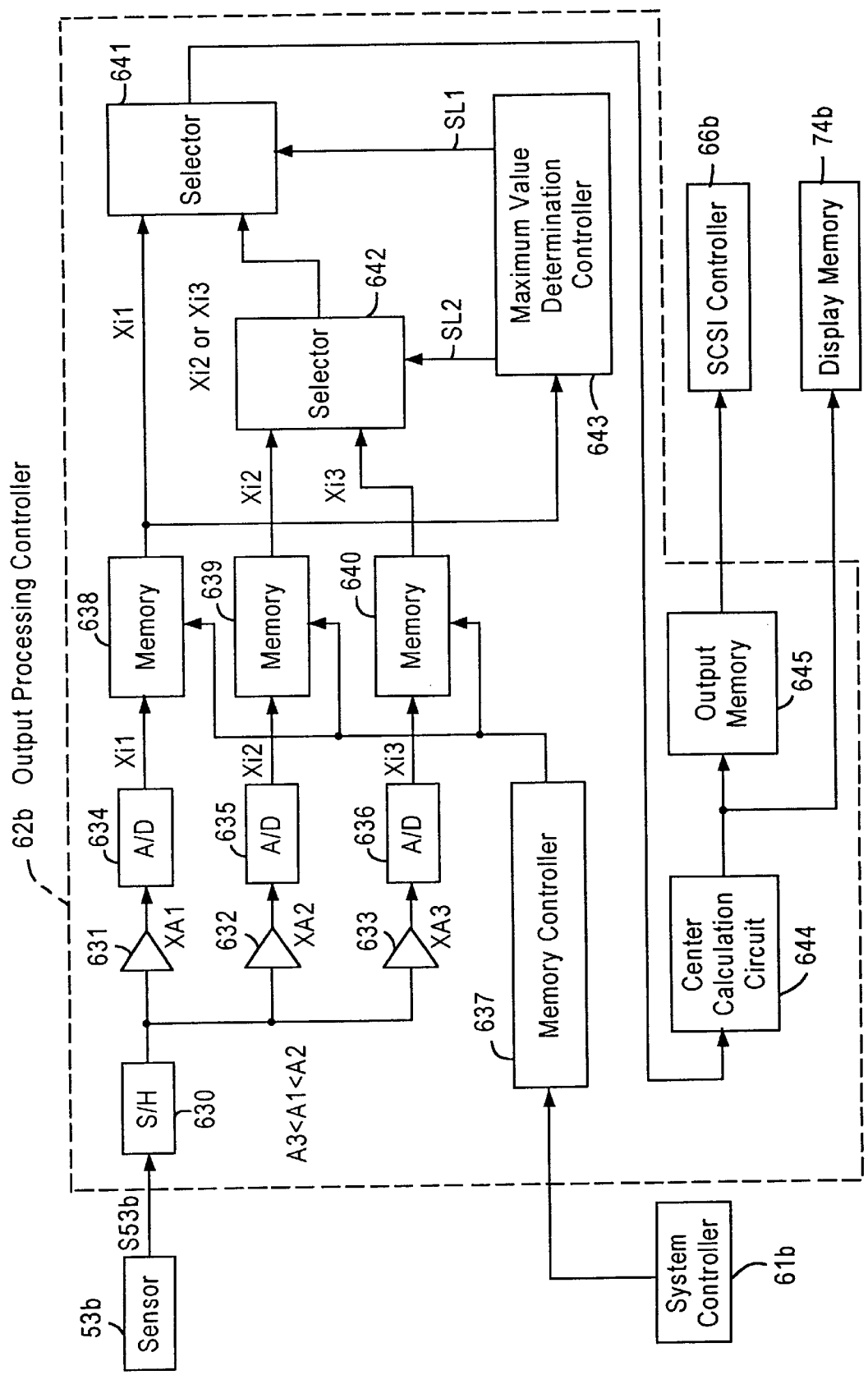
FIG. 29 is an exemplary block diagram of the output processing circuit 62b of FIG. 27.

FIG. 29 is an exemplary block diagram of the output processing circuit 62b of FIG. 27. The photoelectric conversion signal S53b of each pixel transmitted from the sensor 53b is placed on a sampling hold by the sampling hold circuit 630, and is amplified by mutually different amplification factors A1, A2, A3 in three amplifiers 631, 632, 633. The relationships among the three amplification factors A1, A2, A3 are expressed by the equations below.

$$A1 \times b1 = A2 \quad (b1 > 1.0)$$
$$A1 \times b2 = A3 \quad (b2 < 1.0)$$
$$A3 < A1 < A2$$

The output of the amplifier 631 is binarized by the A/D converter 634, then transmitted to the memory 638 as photoreception data Xi1. The usage of the memory 638 is identical to that shown in FIG. 16, and the photoreception data Xi1 are written to an address specified by the memory controller 637. Similarly, the output of the amplifier 632 is binarized by the A/D converter 635, then transmitted to the memory 639 as photoreception data Xi2, and the output of the amplifier 633 is binarized by the A/D converter 636, then transmitted to the memory 640 as photoreception data Xi3. The photoreception data Xi1, Xi2, Xi3 are all 8-bit data.

The photoreception data Xi1, Xi2, Xi3 are read from the memories 638 through 640 for the pixels when writing the 32 frame ends. One among the photoreception data Xi1, Xi2, Xi3 is selected by the selectors 641 and 642, and transmitted to the center calculation circuit 644. The selectors 641 and 642 receive selector signals SL1 and SL2 from the maximum value determination circuit 643.

Figure 30:
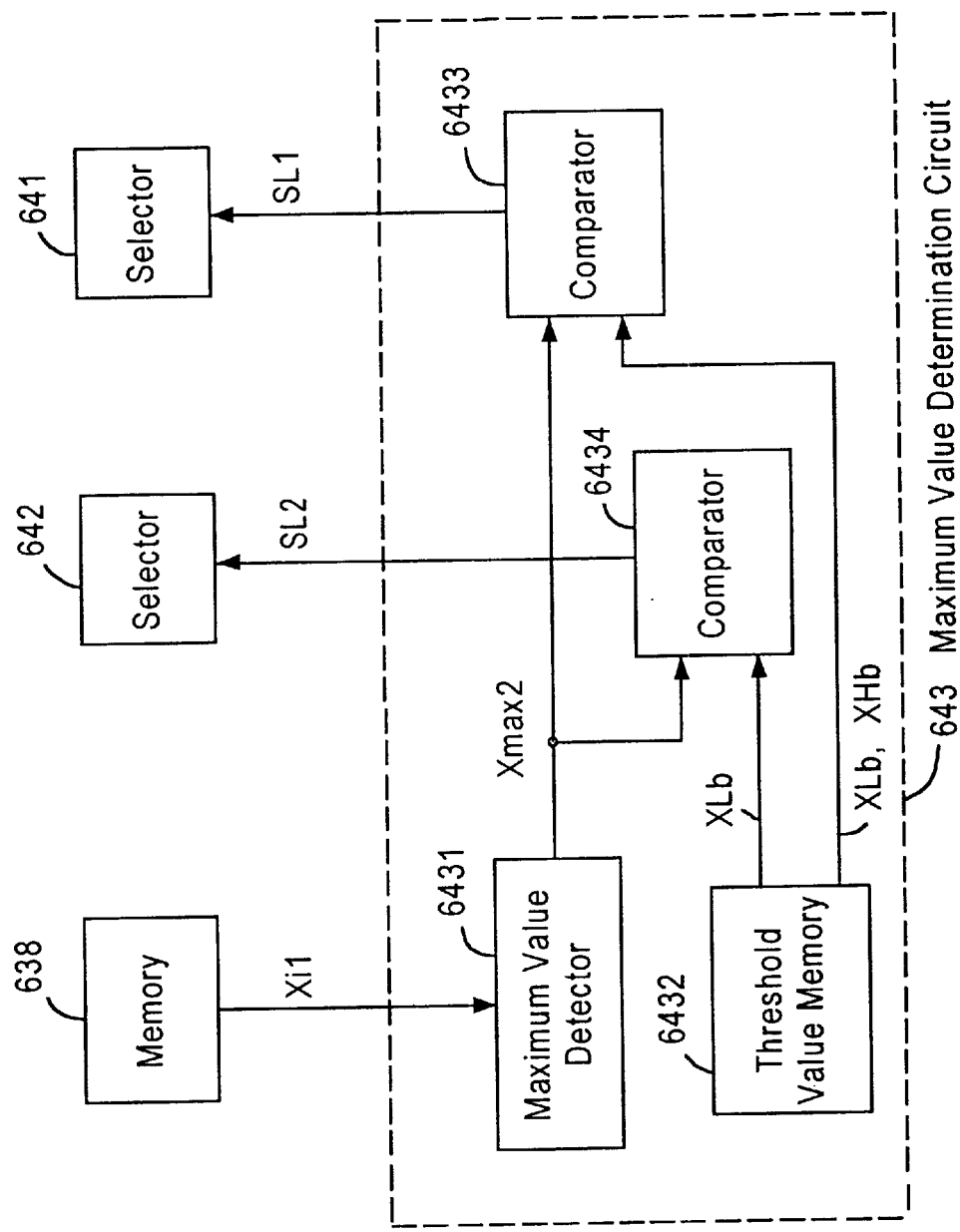
FIG. 30 is an exemplary block diagram of the maximum value determination circuit 643 of FIG. 29.
Figures 31A, 31B:
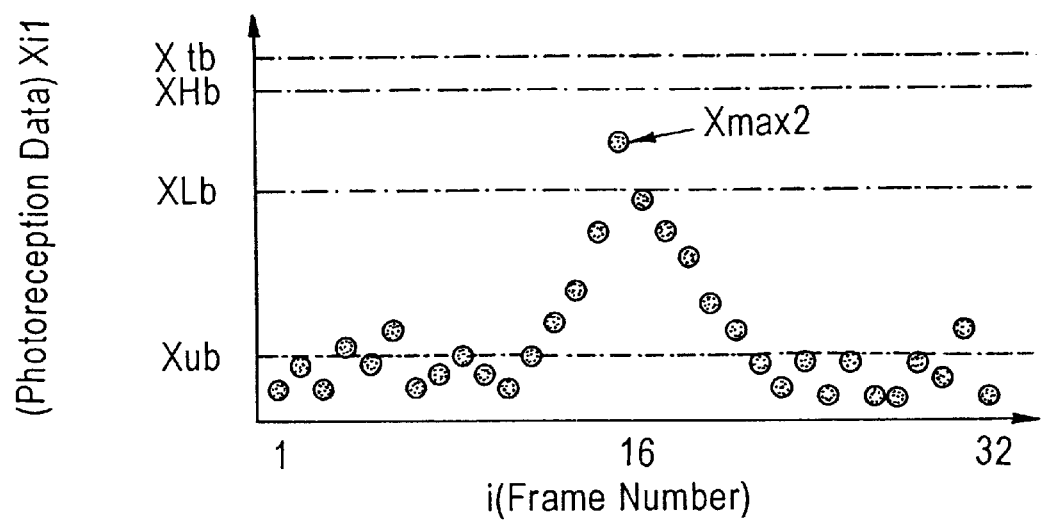
FIG. 31 shows an example of the relationship between the threshold values XLb and XHb and the maximum value Xmax2 of the photoreception data corresponding to a single pixel.

FIG. 30 is an exemplary block diagram of the maximum value determination circuit 643 of FIG. 29, and FIG. 31 shows an example of the relationship between the threshold values XLb and XHb and the maximum value Xmax 2 of the 32 photoreception data corresponding to a single pixel.

The maximum value determination circuit 643 comprises a maximum value detector 6431, a threshold memory unit 6432, and two comparators 6433 and 6434. The photoreception data Xi1 transmitted from the memory 638 are input to the maximum value determination circuit 6431. The maximum value detector 6431 detects the maximum value Xmax2 of the photoreception data Xi1 (32 in the present embodiment) of each pixel. The threshold memory 6432 provides the threshold values XLb and XHb for the comparator 6433, and provides the threshold value XLb for the comparator 6434. The comparator 6433 outputs a selector signal SL1 in accordance with the magnitude relationship of the maximum value Xmax2 and the threshold values XLb and XHb. The comparator 6434 outputs a selector signal SL2 in accordance with the magnitude relationship of the maximum value Xmax2 and the threshold value XLb.

As shown in FIG. 30, the threshold values XLb and XHb are set below the saturation level Xtb and above the solid level Xub determined by the characteristics of the sensor 53*b*. When the maximum value Xmax2 satisfies the condition (XLb<Xmax2 <XHb), the selector signal SL1 becomes active, and the selector 641 selects the photoreception data Xi1 from the memory 638. That is, the photoreception data Xi1 of amplification factor A1 is used in the center calculation (refer to FIG. 28). When the condition is not satisfied, the selector 641 selects the photoreception data (Xi2 or Xi3) from the selector 642. When the maximum value Xmax2 satisfies the condition (XLb≧Xmax2), the selector signal SL2 becomes active, and the selector 642 selects the photoreception data Xi2 from the memory 639, and transmits the data to the selector 641. When the condition is not satisfied, the selector 642 selects the photoreception data Xi3 from the memory 640. When a single pixel is targeted, the relationship Xi3<Xi1<Xi2 obtains.

An accurate center calculation can be accomplished by the aforesaid process using photoreception data that is neither a saturated level or a solid level obtained by a suitable amplification of the sensor output.

Although the three-dimensional cameras 2 and 2*b* of the foregoing embodiments are systems which calculate the center ip and transmit the center ip to a host computer 3, it is to be noted that the three-dimensional cameras 2 and 2*b* may transmit to the host computer 3 the data Σi·Xi and ΣXi of each pixel as measurement results, and the center calculation may be performed by the host computer 3. The photoreception data of amplification factor and suitable slit light intensity need not necessarily be selected in pixel units for each pixel, inasmuch as suitable photoreception data may be selected in units of a plurality of pixels to perform the center calculation. The actual dynamic range of the received light may be broadened by performing a plurality of scans at different slit light intensities, and processing the photoelectric conversion signals obtained in each scan by different amplification factors.

The present invention provides significant advantages over the prior art devices. For example, the present invention provides for the input of three-dimensional data for an entire object at the same resolution as when the depth dimension is small, even when the depth dimension of the object is large.

In addition, the present invention is capable of obtaining three-dimensional data with regard to an object as if the object exhibited uniform reflectivity without receiving operation specification a plurality of times, even when there are marked differences in the reflectivity of the various portions of the object.

Variations of the specific embodiments of the present invention disclosed herein are possible. The present embodiments are therefor to be considered in all respects as illustrative and not restrictive, the scope of the invention being indicated by the appended claims rather than the foregoing description, and all changes which come within the meaning and range of equivalency of the claims are therefor intended to be embraced therein.

What is claimed is:

1. A three-dimensional input device for obtaining data relating to the three-dimensional shape of an object, said input device comprising;

a light projecting device for scanning an object by projecting a detection light on said object while changing the projection direction of the detection light;

an image sensing device for receiving the detection light projected from said light projecting device and reflected by an object, and converting the received detection light to electrical signals; and a control device for controlling said light projecting device to sequentially execute a plurality of scans using detection light of a different intensity for each said scan, each of the plurality of scans including projecting the detection light on said object while changing the projection direction of the detection light.

2. The three-dimensional input device according to claim 1, wherein said light projecting device scans said object by changing the projection direction of the light detection light, and said scans of said object are consecutively executed using detection light of a different intensity for each said scan.

3. The three-dimensional input device according to claim 1, further comprising a display device for displaying images generated on the basis of said detection light reflected by said object, each of said images corresponding to each of the plurality of projection operations.

4. The three-dimensional input device according to claim 1, further comprising a selector operable for selecting one of said images on the display.

5. A method of measuring a three-dimensional image, said method comprising the steps of:

scanning an object by projecting a detection light produced by a light projecting device on said object while changing the projection direction of the detection light;

receiving the detection light projected from said light projecting device and reflected by an object, and converting the received detection light to electrical signals;

controlling said light projecting device to sequentially execute a plurality of scans using detection light of a different intensity for each said scan in accordance with specifications defined prior to the start of operation, each of the plurality of scans including projecting the detection light on said object while changing the projection direction of the detection light.

6. The method of measuring of a three-dimensional image according to claim 5, wherein said object is scanned by changing the projection direction of the detection light in said projecting step, and said scans of said object are consecutively executed using detection light of a different intensity for each said scan in said projecting step.

7. The method of measuring of a three-dimensional image according to claim 6, wherein said object is scanned three times and the intensities of the light projecting device utilized during said three scans is determined based on a reference light intensity, Ls, which is determined prior to performing said three scans.

8. The method of measuring a three-dimensional image according to claim 7, wherein said reference light intensity, Ls, is determined by projecting said detection light at three different intensities at a set projection angle, and analyzing the output of a light sensor receiving said detection light after reflection by said object.

9. The method of measuring a three-dimensional image according to claim 7, wherein if said reference light intensity, Ls, is less than a low level threshold, the light intensity of said light projecting device is set equal to Ls for the first scan of said three consecutive scans, the light intensity of said light projecting device is set equal to an average of a medium intensity range of said light projecting device for the second scan of said three consecutive scans, and the light intensity of said light projecting device is set equal to an average of a high intensity range of said light projecting device for the third scan of said three consecutive scans.

10. The method of measuring a three-dimensional image according to claim 7, wherein if said reference light intensity, Ls, is between a low level threshold and a high level threshold, the light intensity of said light projecting device is set equal to an average of a low intensity range of said light projecting device for the first scan of said three consecutive scans, the light intensity of said light projecting device is set equal to Ls for the second scan of said three consecutive scans, and the light intensity of said light projecting device is set equal to an average of a high intensity range of said light projecting device for the third scan of said three consecutive scans.

11. The method of measuring a three-dimensional image according to claim 7, wherein if said reference light intensity, Ls, is greater than a high level threshold, the light intensity of said light projecting device is set equal to an average of a low intensity range of said light projecting device for the first scan of said three consecutive scans, the light intensity of said light projecting device is set equal to an average of a medium intensity range of said light projecting device for the second scan of said three consecutive scans, and the light intensity of said light projecting device is set equal to Ls for the third scan of said three consecutive scans.

12. The method of measuring a three-dimensional image according to claim 5, further comprising the step of prohibiting the writing of data representing the detection light reflected by the object and output by a light sensor for a given scan, unless the maximum value of the output of said light sensor during said scan is within a predefined range.

13. The method of measuring a three-dimensional image according to claim 12, wherein said data obtained during said given scan is stored in memory if the maximum value of said data is within said predefined range, and said data stored in memory is only up dated during a subsequent scan if the maximum value of the data corresponding to said subsequent scan is within said predefined range.

14. The method of measuring a three-dimensional image according to claim 5, further comprising a step of displaying images generated on the basis of said detection light reflected by said object, each of said images corresponding to each of plurality of projection operations.

15. The method of measuring a three-dimensional image according to claim 14, further comprising a step of selecting one of said images on the display.

16. A three-dimensional input device for obtaining data relating to the three-dimensional shape of an object, said input device comprising:
    a light projecting device for projecting a detection light on said object;
    an image sensing device for receiving the detection light projected from said light projecting device and reflected by said object, and converting the received detection light to electrical signals; and
    a control device for controlling said light projecting device to sequentially execute a plurality of projecting operations using detection light of a different intensity for each said projecting operation, each of the plurality of projecting operations including projecting the detection light on said object.

17. The three-dimensional input device according to claim 16, wherein said light projecting device scans said object by changing the projection direction of the light detection light, and said scans of said object are consecutively executed using detection light of a different intensity for each said scan.

18. The three-dimensional input device according to claim 16, further comprising a display device for displaying images generated on the basis of said detection light reflected by said object, each of said images corresponding to each of the plurality of projection operations.

19. The three-dimensional input device according to claim 16, further comprising a selector operable for selecting one of the said images on the display.

20. A method of measuring a three-dimensional image, said method comprising the steps of:
    projecting a detection light produced by a light projecting device on said object receiving the detection light projected from said light projecting device and reflected by said object with a light sensor, and converting the received detection light to electrical signals;
    controlling said light projecting device to sequentially execute a plurality of projection operations using detection light of a different intensity for each said projection operation in accordance with specifications defined prior to the start of operation, each of the plurality of projecting operations including projecting the detection light on said object.

21. The method of measuring of a three-dimensional image according to claims 20, wherein said object is scanned by changing the projection direction of the detection light in said projecting step, and a plurality of scans of said object are consecutively executed using detection light of a different intensity for each scan in said projecting step.

22. The method of measuring of a three-dimensional image according to claim 21, wherein said object is scanned three times, and the intensities of the light projecting device utilized during said three scans is determined based on a reference light intensity, Ls, which is determined prior to performing said three scans.

23. The method of measuring a three-dimensional image according to claim 22, wherein said reference light intensity, Ls, is determined by projecting said detection light at three different intensities at a set projection angle, and analyzing the output of a light sensor receiving said detection light after reflection by said object.

24. The method of measuring a three-dimensional image according to claim 22, wherein if said reference light intensity, Ls, is less than a low level threshold, the light intensity of said light projecting device is set equal to Ls for the first scan of said three consecutive scans, the light intensity of said light projecting device is set equal to an average of a medium intensity range of said light projecting device for the second scan of said three consecutive scans, and the light intensity of said light projecting device is set equal to an average of a high intensity range of said light projecting device for the third scan of said three consecutive scans.

25. The method of measuring a three-dimensional image according to claim 22, wherein if said reference light intensity, Ls, is between a low level threshold and a high level threshold, the light intensity of said light projecting device is set equal to an average of a low intensity range of said light projecting device for the first scan of said three consecutive scans, the light intensity of said light projecting device is set equal to Ls for the second scan of said three consecutive scans, and the light intensity of said light projecting device is set equal to an average of a high intensity range of said light projecting device for the third scan of said three consecutive scans.

26. The method of measuring a three-dimensional image according to claim 22, wherein if said reference light intensity, Ls, is greater than a high level threshold, the light intensity of said light projecting device is set equal to an average of a low intensity range of said light projecting device for the first scan of said three consecutive scans, the light intensity of said light projecting device is set equal to an average of a medium intensity range of said light projecting device for the second scan of said three consecutive scans, and the light intensity of said light projecting device is set equal to Ls for the third scan of said three consecutive scans.

27. The method of measuring a three-dimensional image according to claim 20, further comprising the step of prohibiting the writing of data representing the detection light reflected by the object and output by the light sensor for a given projection operation, unless the maximum value of the output of said light sensor during said given projection operation is within a predefined range.

28. The method of measuring a three dimensional image according to claim 27, wherein said data obtained during said given projection operation is stored in memory if the maximum value of said data is within said predefined range, and said data stored in memory is only up dated during a subsequent projection operation if the maximum value of the data corresponding to said subsequent projection operation is within said predefined range.

29. A method of measuring a three-dimensional image according to claim 20, further comprising a step of displaying images generated on the basis of said detection light reflected by said object, each of said images corresponding to each of the plurality of projection operations.

30. The method of measuring a three-dimensional image according to claim 20, further comprising a step of selecting one of said images on the display.

* * * * *